US011024180B2

(12) United States Patent
Yang et al.

(10) Patent No.: US 11,024,180 B2
(45) Date of Patent: Jun. 1, 2021

(54) METHODS AND APPARATUS TO VALIDATE DATA COMMUNICATED BY A VEHICLE

(71) Applicant: Intel Corporation, Santa Clara, CA (US)

(72) Inventors: Liuyang Yang, Portland, OR (US);
Yair Yona, Cupertino, CA (US);
Moreno Ambrosin, Hillsboro, OR (US); Xiruo Liu, Portland, CA (US);
Hosein Nikopour, San Jose, CA (US);
Shilpa Talwar, Cupertino, CA (US);
Kathiravetpillai Sivanesan, Portland, OR (US); Sridhar Sharma, Palo Alto, CA (US); Debabani Choudhury, Thousand Oaks, CA (US); Kuilin Clark Chen, Hillsboro, OR (US);
Jeffrey Ota, Morgan Hill, CA (US);
Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 16/234,495

(22) Filed: Dec. 27, 2018

(65) Prior Publication Data
US 2019/0130762 A1    May 2, 2019

(51) Int. Cl.
*H04W 4/40* (2018.01)
*G08G 1/00* (2006.01)
(Continued)

(52) U.S. Cl.
CPC ............... *G08G 1/20* (2013.01); *G01S 5/14* (2013.01); *G08G 1/052* (2013.01); *H04W 4/40* (2018.02); *H04W 12/12* (2013.01)

(58) Field of Classification Search
CPC .......... H04W 4/40; H04W 12/12; G01S 5/14; G08G 1/052
(Continued)

(56) References Cited

U.S. PATENT DOCUMENTS

| 2011/0163908 A1* | 7/2011 | Andersson ............ G01S 5/0072 342/36 |
| 2013/0279392 A1* | 10/2013 | Rubin ...................... H04L 67/12 370/312 |

(Continued)

OTHER PUBLICATIONS

SAE, "Dedicated short range communications (DSRC) message set dictionary support page," [https://www.sae.org/standards/content/j2735_201603/] Tech. Rep. SAE J2735, Mar. 2016, retrieved on Feb. 21, 2017, 267 pages (Uploaded as NPL1-A, NPL1-B, NPL1-C).

(Continued)

*Primary Examiner* — Jack K Wang
(74) *Attorney, Agent, or Firm* — Hanley, Flight & Zimmerman, LLC

(57) ABSTRACT

Methods, apparatus, systems and articles of manufacture are disclosed to validate data communicated by a vehicle. An example apparatus an anomaly detector to, in response to data communicated by a vehicle, at least one of compare an estimated speed with a reported speed or compare a location of the vehicle with a reported location. The apparatus including the anomaly detector further to generate an indication of the vehicle in response to the comparison. The apparatus further includes a notifier to discard data sent by the vehicle and notify surrounding vehicles of the data communicated by the vehicle.

22 Claims, 17 Drawing Sheets

(51) Int. Cl.
    G01S 5/14    (2006.01)
    G08G 1/052   (2006.01)
    H04W 12/12   (2021.01)
(58) Field of Classification Search
    USPC .......................................... 340/936
    See application file for complete search history.

(56) References Cited

U.S. PATENT DOCUMENTS

| 2016/0379350 | A1* | 12/2016 | Matsui | G06T 7/001 |
| | | | | 348/125 |
| 2019/0126935 | A1* | 5/2019 | Phillips | B60W 50/0098 |
| 2020/0025575 | A1* | 1/2020 | Weissman | G01S 13/867 |
| 2020/0079308 | A1* | 3/2020 | Vanterpool | B60R 22/28 |

OTHER PUBLICATIONS

ETSI, "Intelligent transport systems (ITS); vehicular communications; basic set of applications; part 2: Specification of cooperative awareness basic service," [https://www.etsi.org/deliver/etsi_en/302600_302699/30263702/01.03.02_60/en_30263702v010302p.pdf], Final draft ETSI EN 302 637-2 V1.3.1, Sep. 2014, 44 pages.
Chen et al., . "Exposing Congestion Attack on Emerging Connected Vehicle based Traffic Signal Control." [https://www.ndss-symposium.org/wp-content/uploads/2018/02/ndss2018_01B-2_Chen_paper.pdf], Network and Distributed Systems Security (NDSS) Symposium 2018, 15 pages.
Zhou et al., "A Novel method of Doppler shift estimation for OFDM systems," [https://www.researchgate.net/publication/224372655_A_novel_method_of_Doppler_shift_estimation_for_OFDM_systems], pp. 1-7, MILCOM 2008-2008 IEEE Military Communications Conference, Dec. 2008, 8 pages.
Fawzi et al., "Secure Estimation and Control for Cyber-Physical Systems Under Adversarial Attacks," [https://arxiv.org/pdf/1205.5073.pdf], IEEE Transactions on Automatic Control, May 24, 2014, 32 pages.
Mishra et al., "Secure state estimation: optimal guarantees against sensor attacks in the presence of noise," [http://licos.ee.ucla.edu/lib/exe/fetch.php/papers:sse_mskdt.pdf?cache=], 2015 IEEE International Symposium on Information Theory (ISIT), pp. 2929-2933, Apr. 23, 2015, 5 pages.
Capkun et al., "Secure Positioning in Wireless Networks," IEEE Journal on Selected Areas in Communications, vol. 24, Issue 2, Feb. 2006, 13 pages.
Rasmussen et al., "Realization of RF Distance Bounding," [https://www.researchgate.net/publication/221260527], Proceedings of the USENIX Security Symposium, Sep. 2010, pp. 389-402, 14 pages.
Hubaux et al., "The Security and Privacy of Smart Vehicles," [https://www.researchgate.net/publication/3437601_The_Security_and_Privacy_of_Smart_Vehicles], IEEE Security & Privacy May/Jun. 2004, pp. 49-55, 7 pages.

\* cited by examiner

METHODS AND APPARATUS TO VALIDATE DATA COMMUNICATED BY A VEHICLE

FIELD OF THE DISCLOSURE

This disclosure relates generally to vehicular communication, and, more particularly, to methods and apparatus to validate data communicated by a vehicle.

BACKGROUND

In recent years, vehicles have developed with the ability to communicate information among other vehicles, pedestrians, and/or roadside units in the proximity of the vehicles. The communication of information between other vehicles, pedestrians, and/or roadside units (e.g., vehicle-to-everything V2X) allows vehicles to efficiently offer cooperative driving information to surrounding entities.

BRIEF DESCRIPTION OF THE DRAWINGS

FIG. 7 is an example illustration depicting a triple of vehicles, along with an upper bound area (e.g., the upper bound area illustrated in FIG. 6) in which the source vehicle should be in.

FIG. 8 is an additional example illustration depicting a triple of vehicles, along with an upper bound area (e.g., the upper bound area illustrated in FIG. 6) in which the source vehicle should be in.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
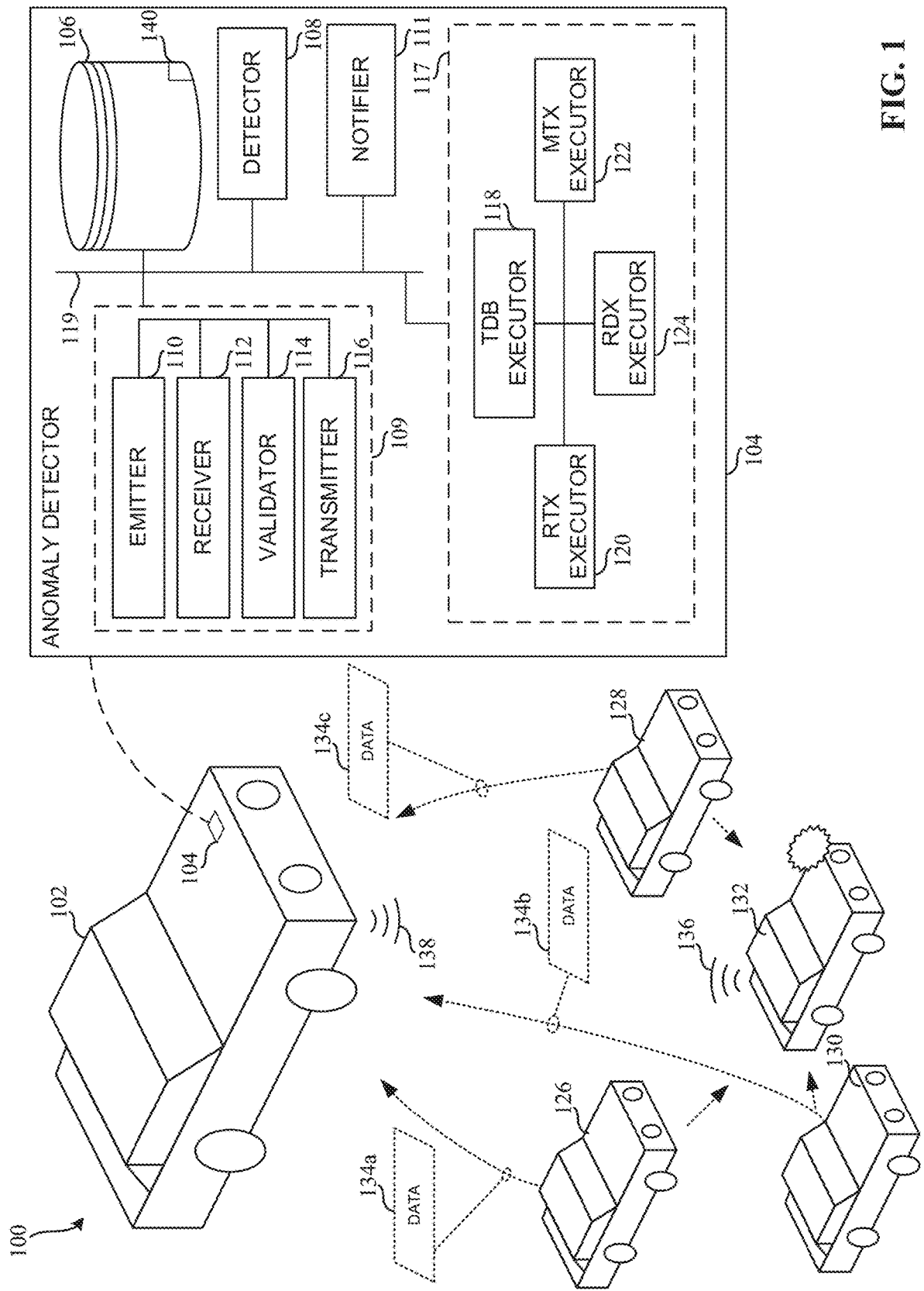
FIG. 1 is a block diagram of an example intelligent transportation system in which an example destination vehicle includes an example anomaly detector.

Vehicle-to-everything (V2X) communication enables information sharing among vehicles, pedestrians, roadside units, and/or any suitable apparatus in the proximity of V2X communication messages. V2X communication includes vehicle-to-vehicle (V2V) and vehicle-to-infrastructure (V2I) communication standards that enhance the safety efficiency of vehicles. V2X communication allows a vehicle to communicate with surrounding devices (e.g., other vehicles, pedestrians, roadside units, etc.) to convey and/or receive messages relevant to conditions, environments, device actions/movement, etc. in an intelligent transportation system. For example, as vehicles in such a system approach an obstruction in a roadway, they may transmit an indication to other vehicles including an autonomous vehicle. Upon receiving such an indication, the autonomous vehicle may reroute itself around the obstruction and, possibly, traffic congestion resulting from the roadway obstruction.

In intelligent transportation systems, V2X enhances the ability for vehicles to handle safety-critical applications (e.g., vehicular collisions), vehicular infotainment systems, local cooperative driving, and/or large-scale traffic management. Since V2X communication in intelligent transportation systems (e.g., a vehicular environment) relies on the trusted communal exchange of messages among devices (e.g., other vehicles, roadside units, etc.), there may be instances in which the communal exchange of messages is compromised (e.g., not trusted or honest). For example, if an unauthorized entity (e.g., an intruder) compromises the exchange of messages sent by a first vehicle, the unauthorized entity (e.g., intruder) may send falsified information to surrounding vehicles on behalf of the compromised first vehicle.

Alternatively, there may exist instances in which an unauthorized entity (e.g., intruder) may impersonate an additional vehicle in the intelligent transportation system to transmit erroneous and/or malicious information to vehicles. For example, an unauthorized entity (e.g., intruder) may relay falsified messages using a wireless device (e.g., software defined radio) from an area not in the intelligent transportation system (e.g., in a neighboring building, etc.) that indicates inaccurate data to vehicles.

Since V2X communication is susceptible to data manipulation attacks, as stated above, traffic flow disruptions, congestion on major roads, or even vehicular collisions may occur. Examples disclosed herein include methods and apparatus to mitigate falsified data, malicious data, misleading data, etc. generated by an unauthorized entity (e.g., intruder, rogue device, compromised device, malfunctioning device, etc.)

Examples disclosed herein include detecting data manipulation attacks from unauthorized entities. Examples disclosed herein include utilizing speed verification to detect and defend against possible V2X attacks. If a vehicle (e.g., a destination vehicle) suspects an attacker vehicle (e.g., a vehicle manipulated by an intruder, attacker, and/or source vehicle), the destination vehicle may perform verification by comparing an estimated speed obtained from data transmitted between the destination vehicle and the source vehicle with the speed reported by the source vehicle. In examples disclosed herein, the source vehicle and/or data from the source vehicle may be declared valid or invalid based on the comparison of the estimated speed with the reported speed. In examples disclosed herein, the vehicle may compare the estimated speed with the reported speed of the source vehicle by determining an estimated Doppler frequency shift using information embedded in the PHY layer of the packet sent between the vehicles (e.g., the destination vehicle and the source vehicle). Furthermore, the destination vehicle use the reported speed to calculate the reported Doppler frequency shift. In such example, the destination vehicle may compare the estimated Doppler frequency shift with the calculated Doppler frequency shift. In other examples disclosed herein, the destination vehicle may compare the estimated speed of the source vehicle with the reported speed of the source vehicle using any other suitable method (e.g., comparing transmission times of radio frequency signals, comparing transmission times of data between vehicles, etc.).

In examples disclosed herein, data manipulation attacks from a source vehicle (e.g., a vehicle manipulated by an intruder and/or attacker) may be identified by verifying the location of the source vehicle. Examples disclosed herein include coordinating with surrounding vehicles and/or entities in the surrounding intelligent transportation system to verify the location of a source vehicle. Examples disclosed herein utilize collaborative V2X information to verify the location of the source vehicle to determine whether the source vehicle is valid or invalid source of data. In some examples disclosed herein, the verification may indicate that the source vehicle is reporting an invalid location. Alternatively, in other examples disclosed herein, the methods and apparatus may not only detect that the source vehicle is reporting an invalid location, but also detect the true location of the source vehicle.

Examples disclosed herein include determining the validity of the source vehicle. In examples disclosed herein, if the source vehicle is deemed invalid, then the data sent by the source vehicle is discarded. Additionally, examples disclosed herein include warning surrounding entities (e.g., other vehicles, roadside units, etc.) and/or a central authority of the source vehicle.

In some examples disclosed herein, speed verification and/or location verification may be used to determine whether or not a source vehicle is valid or invalid. In examples disclosed herein, any combination of the disclosed methods and apparatus may be used to determine the validity of the source vehicle.

FIG. 1 is a block diagram of an example intelligent transportation system 100 in which an example destination vehicle 102 includes an example anomaly detector 104. The example intelligent transportation system 100 includes the destination vehicle 102 and the surrounding entities capable of V2X communication (e.g., the vehicles 126, 128, and 130). Additionally, in the example illustrated in FIG. 1, includes a source vehicle 132. In examples disclosed herein, the destination vehicle 102 may be referred to as a victim vehicle, compromised vehicle, etc., if the source vehicle sources, sends, transmits, communicates, etc. false, erroneous, and/or manipulated data to the destination vehicle 102. Likewise, in examples disclosed herein, the source vehicle 132 may be referred to as an attacker vehicle and/or a suspected attacker vehicle if the source vehicle 132 sources, sends, transmits, communicates, etc. false, erroneous, and/or manipulated data to the destination vehicle 102. The destination vehicle 102 includes the anomaly detector 104. Additionally, the destination vehicle 102 communicates with the vehicles 126, 128, and 130 via wireless communication. In other examples, the destination vehicle 102 may communicate with the vehicles 126, 128, and 130 via any suitable means of communication (e.g., 802.11p based Dedicated Short Range Communication (DSRC) or cellular V2X (C-V2X), 5G, etc.). The example vehicles 126, 128, and 130 communicate respective data 134a, 134b, and 134c to the destination vehicle 102 and the source vehicle 132.

In the example disclosed in FIG. 1, the destination vehicle 102 may be an autonomous vehicle, a semi-autonomous vehicle, a legacy vehicle (e.g., a vehicle which is completely operated by humans), or any other suitable vehicle. The destination vehicle 102 is capable of V2X communication among the varying entities in the intelligent transportation system 100. In other examples disclosed herein, the destination vehicle 102 may communicate with the varying entities in the intelligent transportation system 100 by any means necessary (e.g., V2V communication standards, V2I communication standards, etc.).

The anomaly detector 104 includes an example vehicle profile database 106, an example detector 108, an example notifier 111, an example speed verifier 109, and an example location verifier 117. The vehicle profile database 106 may interact with the detector 108, the notifier 111, the speed verifier 109 and/or the location verifier 117 via the example communication bus 119. In some examples disclosed herein, the communication bus 119 is a physical conductive bus capable to transmitting data signals (e.g., electronic signals); however, the communication bus 119 is not limited to a physical conductive bus and, in fact, may be a wireless communication path or any other suitable communication mode. In the example illustrated in FIG. 1, the anomaly detector 104 is located in the destination vehicle 102 to facilitate the communication among the vehicles 126, 128, and 130, and/or the source vehicle 132. The anomaly detector 104 may communicate to the vehicles 126, 128, and 130 using V2X communication standards; however, examples disclosed herein may include any suitable communication standard (e.g., V2V, V2I, etc.).

The vehicles 126, 128, and 130 in the intelligent transportation system 100 communicate with the destination vehicle 102. In the example illustrated in FIG. 1, the vehicles 126, 128, and 130 are autonomous vehicles; however, in other examples disclosed herein, the vehicles 126, 128, and 130 may be semi-autonomous, legacy vehicles (e.g., a vehicle which is operated completely by humans), or any other suitable vehicle. The vehicles 126, 128, and 130 are trusted vehicles. For example, the vehicles 126, 128 and 130 relay data 134a, 134b, and 134c respectively, to the destination vehicle 102 that is trusted data. Additionally, the vehicles 126, 128, and 130 may communicate with the source vehicle 132 using traditional V2X communication standards.

The source vehicle 132 in the intelligent transportation system 100 communicates with the destination vehicle 102 by sending data 136 to the destination vehicle 102. In other examples disclosed herein, the source vehicle 132 may send the data 136 to the destination vehicle 102 and/or other vehicles 126, 128, and/or 130 in the intelligent transportation system 100. Examples disclosed herein include verifying the data 136 communicated by vehicles (e.g., the source vehicle 132). In some examples disclosed herein, the source vehicle 132 may be outside of the intelligent transportation system 100. For example, the source vehicle 132 may be a phantom vehicle in which the source vehicle 132 is physically non-existent. In such example, the source vehicle 132 is existent virtually in which the source vehicle 132 is a phantom vehicle that tricks the destination vehicle 102 and/or the vehicles 126, 128, and 130 into observing a non-existent vehicle.

The example data 138 sent by the destination vehicle 102 may include data representative of a request, speed information, location information, or any other relevant type of information. In examples disclosed herein, the data 138 sent by the destination vehicle 102 may be a request sent to the source vehicle 132 for speed verification. In such example, the source vehicle 132 transmits the data 136 to the destination vehicle 102 via V2X communication or any other mode of communication (e.g., V2V, V2I, etc.). Alternatively, in some examples disclosed herein, the data 138 sent by the destination vehicle 102 may be a request sent to the vehicles 126, 128, and/or 130 for the data 134a, 134b, and/or 134c. In such example, the data 134a, 134b, and/or 134c may include relevant information about respective locations, speed, the location of the source vehicle 132, the speed of the source vehicle 132, and/or any other relevant information. In examples disclosed herein, the source vehicle 132 may transmit falsified data (e.g., the data 136) to the destination vehicle 102 and/or the vehicles 126, 128, and/or 130.

The vehicle profile database 106 include relevant information pertaining to the surrounding entities in the intelligent transportation system 100. In examples disclosed here, the vehicle profile database 106 obtains and/or stores the data 134a, 134b, and/or 134c sent by the vehicles 126, 128, and 130 respectively. Additionally, the vehicle profile database 106 obtains and/or stores the data 136 sent by the source vehicle 132. The vehicle profile database 106 may organize, characterize, and/or manage the data 134a, 134b, 134c, and/or 136 into individual vehicle profiles. The destination vehicle 102 utilizes the information stored in the vehicle profile database 106 to interact properly and efficiently in the intelligent transportation system 100. For example, the destination vehicle 102 may alter course (e.g., slow down, move over, speed up) if the information stored in the vehicle profile database 106 indicates In examples disclosed herein, the detector 108 communicates with the vehicular profile database 106 to obtain information pertaining to the intelligent transportation system 100. The detector 108 detects the presence of the source vehicle 132 and/or the vehicles 126, 128, and/or 130. The detector 108 may determine which of the vehicles (e.g., the vehicles 126, 128, 130, and/or the source vehicle 132) is the suspected attacker vehicle. In examples disclosed herein, the detector 108 may not know which vehicle (e.g., the vehicles 126, 128, 130, and/or the source vehicle 132) is the suspected attacker vehicle. In such examples, the detector 108 may communicate with the speed verifier 109, the location verifier 117, the notifier 111, and/or the vehicle profile database 106 to determine if a vehicle (e.g., the vehicles 126, 128, 130, and/or the source vehicle 132) is a suspected attacker vehicle. Alternatively, the detector 108 may request a verification packet from all surrounding vehicles (e.g., the vehicles 126, 128, 130, and/or the source vehicle 132) in the intelligent transportation system 100. In this manner, the detector 108 communicates with the vehicular profile database 106 to determine if variations exist between the verification packets received and the current profiles in the vehicular profile database 106. For example, if the vehicular profile database 106 includes a vehicular profile 140 that is inconsistent with a vehicular profile sent by the source vehicle 132 (e.g., a vehicular profile sent via the data 136), then the detector 108 identifies the existence of a suspicious vehicle in the intelligent transportation system 100.

The example speed verifier 109 includes an example emitter 110, an example receiver 112, an example validator 114, and an example transmitter 116. The speed verifier 109 communicates with the vehicle database profile 106 and the detector 108. In examples disclosed herein, the speed verifier 109 obtains and/or receives an indication from the detector 108 of the existence of the suspicious vehicle in the intelligent transportation system 100. In some examples disclosed herein, the speed verifier 109 may independently request the vehicles (e.g., the vehicles 126, 128, 130, and/or the source vehicle 132) to report their respective speed.

The example emitter 110 communicates with the receiver 112, the validator 114, and the transmitter 116. In some examples disclosed herein, the emitter 110 may be implemented using a variety of hardware logic circuits and/or any suitable hardware component. The emitter transmits a verification request via the data 138 to the entities in the intelligent transportation system 100 (e.g., the vehicles 126, 128, 130, and/or the source vehicle 132).

In the example illustrated in FIG. 1, the receiver 112 obtains the data 134a, 134b, 134c, and/or the data 136 from the entities in the intelligent transportation system 100 (e.g., the vehicles 126, 128, 130, and/or the source vehicle 132). The receiver 112 may obtain a Doppler frequency shift sent by the entities in the intelligent transportation system 100 (e.g., the vehicles 126, 128, 130, and/or the source vehicle 132). In examples disclosed herein, the receiver 112 may obtain data (e.g., the data 134a, 134b, 134c, and/or the data 136) without any indication and/or request for data. For example, the receiver 112 may receive the data (e.g., the data 134a, 134b, 134c, and/or the data 136) during regular V2X, V2V, V2I, etc., communication broadcasts.

The example validator 114 communicates with the receiver 112 to analyze and/or validate the data received (e.g., the data 134a, 134b, 134c, and/or the data 136) to determine whether or not the entities in the intelligent transportation system 100 are valid or invalid. In examples disclosed herein, the validator 114 estimates, based on the received data (e.g., the data 134a, 134b, 134c, and/or the data 136), the Doppler frequency shift for the respective vehicles 126, 128, 130, and/or the source vehicle 132. In some examples disclosed herein, the validator 114 may estimate the Doppler frequency shift for a single vehicle (e.g., the source vehicle 132). The validator 114 calculates based on the received speed and/or its own speed (e.g., the speed of the victim vehicle) the Doppler frequency shift. The validator 114 compares the estimated Doppler frequency shift with the calculated frequency shift to validate and/or invalidate the entities in the intelligent transportation system 100 (e.g., the data 134a, 134b, 134c, and/or the data 136).

The transmitter 116 sends the result from the validator 114 to the notifier 111 and/or the vehicle profile database 106. In some examples disclosed herein, the transmitter 116 may communicate with the location verifier 117 to provide a result of the indication. In some examples disclosed herein, the transmitter 116 may be implemented by using a variety of hardware logic circuits and/or any suitable hardware component.

The example location verifier 117 includes the example trilateration distance bounding (TDB) executor 118, the example redundant distance cross-check (RDX) executor 124, the example redundant trilateration cross-check (RTX) executor 120, and the example majority tuples cross-check (MTX) executor 122. In examples disclosed herein, the location verifier 117 communicates with the vehicle profile database 106, the detector 108, the speed verifier 109, and/or the notifier 111 via the communication bus 119. The location verifier 117 may obtain an indication of the source vehicle 132 from the detector 108. In other examples disclosed herein, the location verifier 117 determines whether or not the source vehicle 132 is a valid or invalid vehicle.

Having obtained an indication of the attacker vehicle from the detector 108, the TDB executor 118 performs trilateral distance bounding to determine an upper bound distance estimate. In examples disclosed herein, the TDB executor 118. For example, the TDB executor 118 may signal to the vehicles 126, 128, and/or 130 to transmit data 134*a*, 134*b*, and/or 134*c* indicating each vehicle 126, 128, and/or 130 respective distance estimates to the source vehicle 132. For example, the vehicle 126, through V2X, V2V, V2I, etc., communication, may send data 134*a* indicating an estimated distance to the source vehicle 132. In such example, source vehicle 132 transmits data 136 to the vehicle 126. Since the source vehicle 132 cannot anticipate a location verification request from the vehicle 126, to send data 136, it can delay its response. Therefore, the location estimate sent by the vehicle 126 as data 134*a* is an estimated upper-bound location. In other examples disclosed herein, the TDB executor 118 may request an upper-bound location estimate from other entities in the intelligent transportation system 100.

The example RDX executor 124 obtains an indication from the entities in the intelligent transportation system 100 of their respective distance estimates to the source vehicle 132. In examples disclosed herein, the RDX executor 124 compares the location estimates from the entities in the intelligent transportation system 100 to a location estimate calculated by the detector 108 to verify whether or not a majority agree. For example, if the majority of location estimates obtained from the entities in the intelligent transportation system 100 are similar to the location estimate obtained using the detector 108, the RDX executor 124 verifies the suspected attacker is valid. Likewise, if the majority of location estimates obtained from the entities in the intelligent transportation system 100 are not similar to the location estimate obtained using the detector 108, the RDX executor 124 verifies the suspected attacker is invalid. In examples disclosed herein, the RDX executor 124 initially performs validation of the source vehicle 132. In some examples disclosed herein, if the RDX executor is unable to validate the source vehicle 132, then the RTX executor 120 and/or the MTX executor 122 may execute a series of instructions to perform the validation of the source vehicle 132.

The example RTX executor 120 communicates with the TDB executor 118 to obtain the upper-bound location estimates. The RTX executor 120 communicates with the TDB executor 118 to obtain an upper-bound location estimate for all triples of location-distance pairs. For example, if there are 5 entities in the intelligent transportation system 100, the RTX executor obtains an upper-bound location estimate for all 10 triples of vehicles. Each triple of vehicles generates an upper-bound area of the estimated location of the source vehicle 132. If the majority of triples estimate a similar upper-bound area for the estimated location of the source vehicle 132, the RTX executor 120 determines the source vehicle 132 is a valid vehicle. Likewise, if the majority of triples estimate varying upper-bound areas for the estimated location of the source vehicle 132, the RTX executor 120 determines the source vehicle 132 is an invalid vehicle.

The example MTX executor 122 communicates with the TDB executor 118 to obtain the upper-bound location estimates. The MTX executor 122 determines not only whether or not the source vehicle 132 is valid or invalid, but also the true location of the source vehicle 132. In examples disclosed herein, the MTX executor 122 may communicate with the RDX executor 124 to obtain the respective distance estimates from the entities in the intelligent transportation system 100.

The example notifier 111 obtains the indication from the speed verifier 109, the location verifier 117, and/or the detector 108 of the source vehicle 132 (e.g., whether or not the source vehicle 132 is a valid or invalid vehicle). In examples disclosed herein, the notifier 111 indicates to the destination vehicle 102 either the location, speed, validity, and/or any combination of the above pertaining to the source vehicle 132. The example notifier 111 may communicate with the vehicle profile database 106 to remove data packets sent by the source vehicle 132. Additionally, the notifier 111 may communicate with the vehicles 126, 128, and/or 130 via the data 138 of the source vehicle 132.

Figure 2:
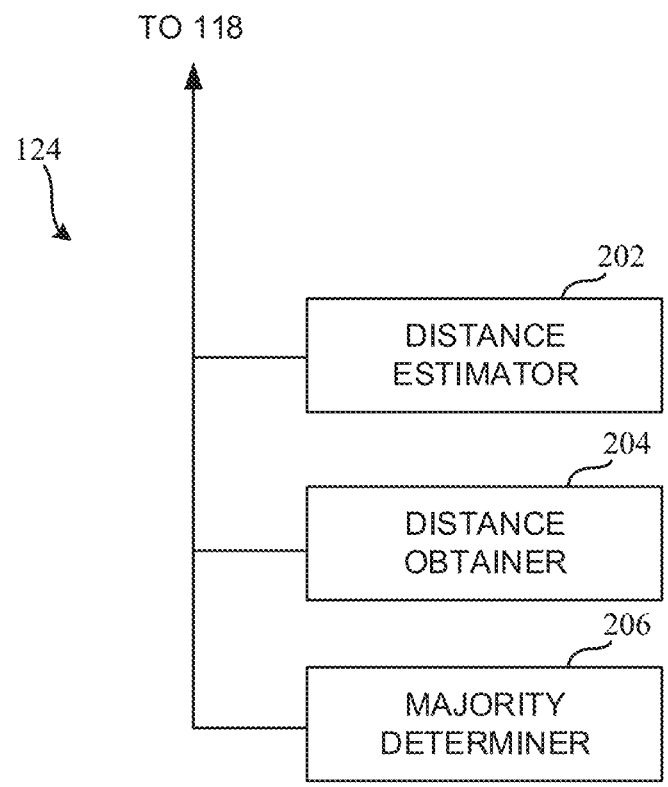
FIG. 2 is a block diagram of the example redundant distance cross-check (RDX) executor of FIG. 1.

FIG. 2 is a block diagram of the example redundant distance cross-check (RDX) executor 124 of FIG. 1. The RDX executor 124 includes an example distance estimator 202, an example distance obtainer 204, and an example majority determiner 206. In examples disclosed herein, the distance obtainer 204 interacts with the entities of the intelligent transportation system 100 of FIG. 1 (e.g., the vehicles 126, 128, and 130) to obtain respective distance estimations to the source vehicle 132 of FIG. 1. The majority determiner 206 obtains a majority vote with respect to the distance estimations provided from the entities in the intelligent transportation system 100 (e.g., the vehicles 126, 128, and 130). For example, if there are N vehicles, in which N is at least 2i+1, the majority determiner 206 determines if at least i+1 distance estimations are similar. In such examples, the variable (i) represents the number of suspected attacker vehicles (e.g., one source vehicle 132 in FIG. 1), and N represents the number of entities in which the distance estimations are obtained (e.g., three, the vehicles 126, 128, and 130). In the event in which i+1 observers estimate similar distance locations, the RDX executor verifies the source vehicle 132 is valid. Likewise, in the event in which i+1 observers estimate varying distance locations (e.g., differ by a threshold amount), the RDX executor verifies the source vehicle 132 is invalid.

Alternatively, in some examples disclosed herein, the distance estimator 202 may obtain distance estimates from the N vehicles. In any of the examples disclosed herein, the RDX executor 124 may utilize standard V2X, V2V, V2I, etc., communication to obtain distance estimations.

Figure 3:
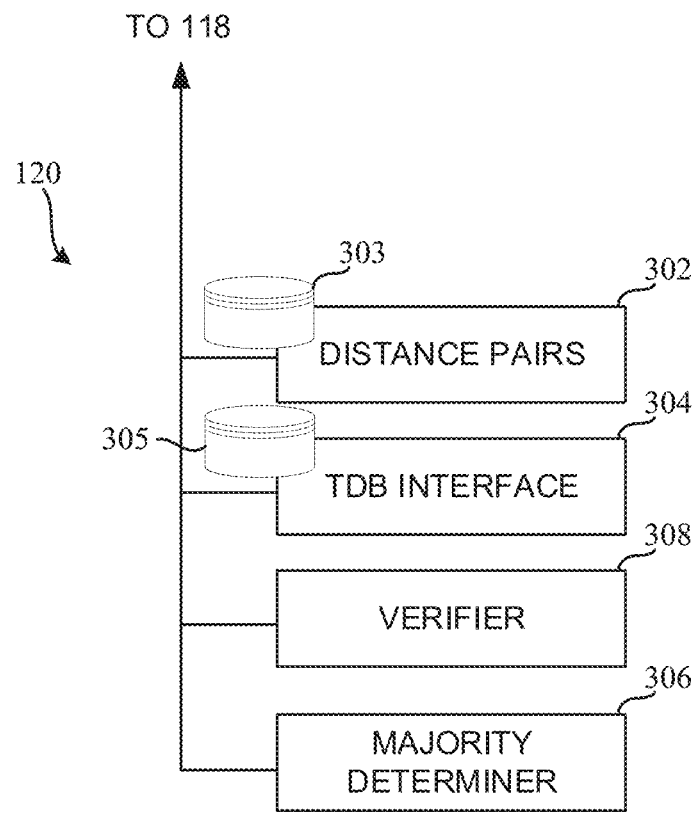
FIG. 3 is a block diagram of the example redundant trilateration cross-check (RTX) executor of FIG. 1.

FIG. 3 is a block diagram of the example redundant trilateration cross-check (RTX) executor 120 of FIG. 1. The RTX executor 120 includes the example distance pairs 302, the example TDB interface 304, the example verifier 308, and the example majority determiner 306. The distance pairs 302 include a distance pair database 303 in which a profile of all existing distant pairs 302 are stored. In examples disclosed herein, a distance pair 302 is a triple of location-distance pair from a pool of N observers. For example, if there are 5 observers (e.g., N=5), there will be $$\binom{5}{3} = 10$$

triples of N vehicle combinations in the intelligent transportation system 100. The triple location-distance pairs are stored in the distance pair database 303.

The TDB interface 304 communicates with the TDB determiner 118 of FIG. 1 to obtain a TDB distance estimate for all triple location-distance pairs in the distance pair database 303. In examples disclosed herein, the TDB interface 304 may obtain and/or determine the estimated location from the triple location-distance pairs by minimizing the following equation:

$$\text{Arg min}_{x,y} \Sigma_{i=1}^{3}(\sqrt{(x_i-x)^2+(y_i-y)^2}-\hat{R}_l) \quad (1)$$

In equation 1, $x_i$ and $y_i$ are respective location coordinates of the entities in the intelligent transportation system 100 (e.g., the vehicles 126, 128, and/or 130), and x and y are respective location coordinates of the source vehicle 132. $\hat{R}_l$ is an upper-bound estimation of the distance from the $i^{th}$ entity in the intelligent transportation system 100 (e.g., the vehicles 126, 128, and/or 130) from the source vehicle 132. In some examples disclosed herein, the upper-bound estimation $\hat{R}_l$ may be obtained via communication with the TDB interface 304 and/or any other location verification device.

The example majority determiner 306 communicates with the verifier 308 and the TDB interface 304. In some examples disclosed herein, the majority determiner 306 determines if a majority of location-distance pair estimates (e.g., the location-distance pair estimates determined by the TDB interface 304) fall within a certain radius $\hat{R}_l$. If the majority determiner 306 in the RTX executor 120 determines a majority of the location-distance pairs estimate a similar radius $\hat{R}_l$, then the verifier 308 can communicate with the notifier 111 of FIG. 1 to indicate the source vehicle 132 is valid. If the majority determiner 306 in the RTX executor 120 determines a majority of the location-distance pairs estimate different radii $\hat{R}_l$, respectively, then the verifier 308 can communicate with the notifier 111 of FIG. 1 to indicate the source vehicle 132 is valid.

Figure 4:
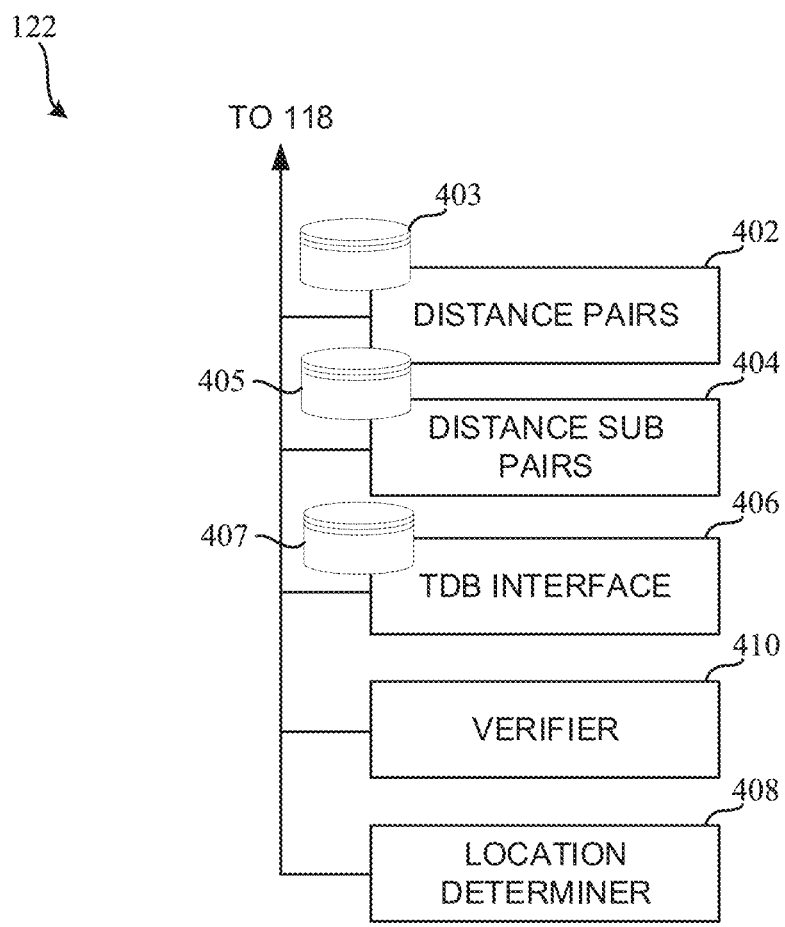
FIG. 4 is a block diagram of the example majority tuples cross-check (MTX) executor of FIG. 1.

FIG. 4 is a block diagram of the example majority tuples cross-check (MTX) executor 122 of FIG. 1. Similar to the RTX executor 120 of FIG. 1, the MTX executor 122 of FIG. 1 includes the example distance pairs 402, the example distance sub pairs 404, the example TDB interface 406, the example verifier 410, and the example location determiner 408. The distance pairs 402 include a distance pair database 403 in which a profile of all existing distant pairs 402 are stored. In examples disclosed herein, a distance pair 402 is a (i+3)-tuple of location-distance pair from a pool of N observers. For example, if there are 7 observers (e.g., N=7), there will be $$\binom{2i+3}{i+3} = \binom{7}{5} = 21$$

possible combination of (i+3)-tuple location-distance pair groups of N vehicles in the intelligent transportation system 100. In such example, (i) indicates the number of compromised observers (e.g., 2 compromised vehicles). The (i+3)-tuple location-distance pairs are stored in the distance pair database 403.

The distance sub pairs 404 include a distance sub pair database 405 in which a profile of all existing distant sub pairs 404 are stored. In examples disclosed herein, a distance sub pair 404 is a triple of the (i+3)-tuple location-distance sub pair from a pool of N observers. For example, if there are 7 observers (e.g., N=7), there will be $$\binom{i+3}{3} = \binom{5}{3} = 10$$

possible combination of triple location-distance sub pair groups of N vehicles in the intelligent transportation system 100. In such example, (i) indicates the number of compromised observers (e.g., 2 compromised vehicles). The triple location-distance pairs are stored in the distance sub pair database 405.

The TDB interface 406 communicates with the TDB determiner 118 of FIG. 1 to obtain a TDB distance estimate for all (i+3)-tuple location-distance pairs in the distance pair database 403. In examples disclosed herein, the TDB interface 406 may obtain and/or determine the estimated location from the triple location-distance pairs by minimizing equation 1, set forth above.

In equation 1, $x_i$ and $y_i$ are respective location coordinates of the entities in the intelligent transportation system 100 (e.g., the vehicles 126, 128, and/or 130), and x and y are respective location coordinates of the source vehicle 132. $\hat{R}_l$ is an upper-bound estimation of the distance from the $i^{th}$ entity in the intelligent transportation system 100 (e.g., the vehicles 126, 128, and/or 130) from the source vehicle 132. In some examples disclosed herein, the upper-bound estimation $\hat{R}_l$ may be obtained via communication with the TDB interface 406 and/or any other location verification device.

The example location determiner 408 communicates with the location estimates from the location-distance pairs stored in the distance pair database 403 and/or the distance sub pair database 405 to determine a location of the source vehicle 132. In examples disclosed herein, the location determiner 408 determines, for each (i+3)-tuple of location-distance pairs, an estimated location of each triple of location distance pairs. For example, if there are 7 observers, for each 5-tuple of observers, the location determiner 408 can estimate a location from each triple in the 5-tuple of observers. In this manner, the location determiner 408 can determine the true location of the source vehicle 132, as long as there exist i+3 honest entities (e.g., i+3 entities that are not compromised). In examples disclosed herein, the location determiner 408 may communicate with the verifier 410 the true location of the source vehicle 132. The verifier 410 may communicate with the notifier 111 of FIG. 1 to identify the true location of the source vehicle 132.

Figure 5:
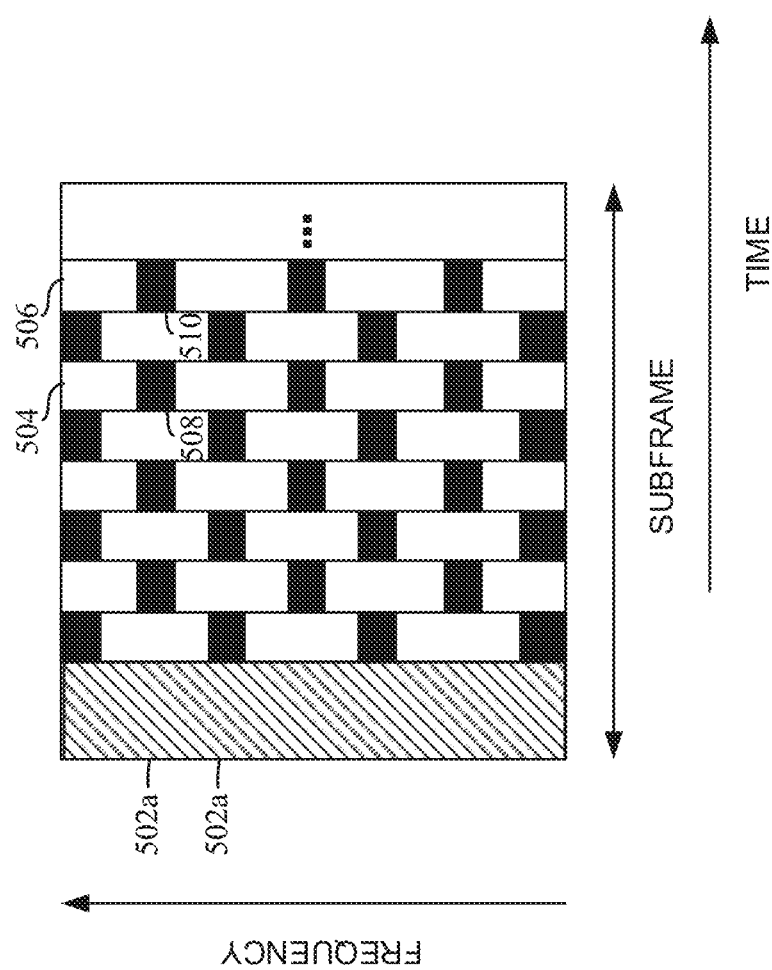
FIG. 5 is an illustration of an example framework for estimating Doppler frequency shift.

FIG. 5 is an illustration of an example framework 500 for estimating Doppler frequency shift. The framework 500 illustrates example control channels 502a, 502b, example data channels 504, 506, and example resource elements 508, 510. The framework 500 is an example frame structure of an OFDMA (Orthogonal Frequency Division Multiple Access) based wireless communication system. The data channels 504, 506 carry demodulation reference signals (DMRS) the resource elements 508, 510, and data resource elements. The DMRS signals are used to estimate the channel for decoding of the data. The example receiver 112 and/or the example validator 114 of FIG. 1 utilizes the DMRS signals for estimating the Doppler frequency shift as well. Thus, the usage of the framework 500 incurs no additional overhead.

An equation for the autocorrelation of the DMRS signals is derived and it depends on the Doppler frequency. In examples disclosed herein, the Doppler estimation could be done in the frequency domain. The OFDMA time domain transmitted signal x(i,n) after IFFT (Inverse Fast Fourier Transform) is written as:

$$x(i, n) = \frac{1}{N} \sum_{k=0}^{N-1} X(i, k) e^{-\frac{j2\pi nk}{N}} \quad (2)$$

The function X(i,k) is the frequency domain transmitted signal, the variable k is the sub carrier index, the variable N is the number of sub carriers in the OFDMA system, and 'i' is the OFDM symbol index. For the DMRS pilot symbols, X(i,k), the Zhadoff-Chu sequence may be used. In other examples disclosed herein, any suitable constant amplitude orthogonal sequences may be used. The received signal, Y(i,k), after the FFT is:

$$Y(i,k) = X(i,k)g(i,k) + W(i,k) \quad (3)$$

The function G(i,k) can be modeled as the following:

$$g(i, k) = \frac{1}{N} \sum_{n=0}^{N-1} h(i, n) e^{-\frac{j2\pi nk}{N}} \quad (4)$$

In equation 4, h(i,n) is the channel impulse response in the time domain. The function, W(i,k), accounts for the additive white Gaussian noise. Additionally, the autocorrelation of the channel impulse response could be written as:

$$\text{autocorellation} = E[h(i_1, n_1) h^*(i_2, n_2)] \quad (5)$$

In examples disclosed herein, the autocorrelation may be further simplified to:

$$\text{autocorrellation} = \sigma^2 J_0 \left\{ 2\pi f_{de} T_s \left[ (i_1 - i_2) + \frac{n_1 - n_2}{N_{sam}} \right] \right\} \quad (6)$$

In equation 6, $$J_0 \left\{ 2\pi f_d T_s \left[ (i_1 - i_2) + \frac{n_1 - n_2}{N_{sam}} \right] \right\}$$

is the zeroth order Bessel function of the first kind. The variable $f_d$ is the maximum Doppler frequency, the variable $T_s$ is the sampling time, the variable $N_{sam}$ is the number of samples which includes the cyclic prefix (CP) length in an OFDMA system, and the variable $\sigma^2$ represents the power.

In examples disclosed herein, the speed verifier 109 of FIG. 1 may execute the above set-forth methods and equations. For example, the receiver 112 may obtain the resource elements 508 and 510 in which the validator 114 may utilize, along with equations 2-6, to calculate and/or estimate the Doppler shift.

Figure 6:
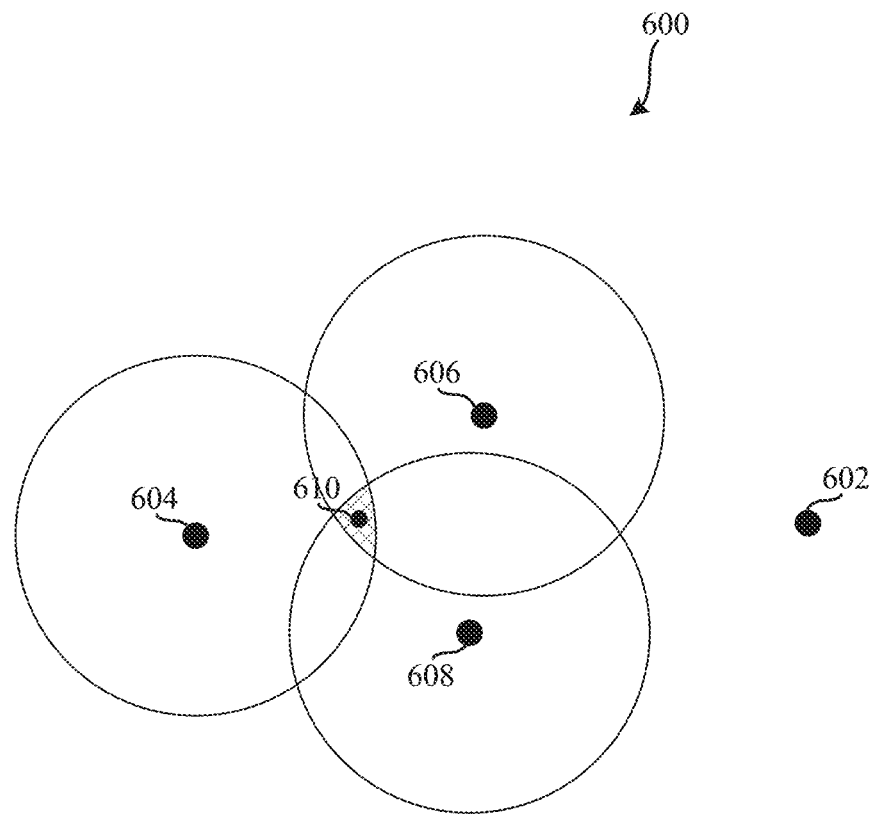
FIG. 6 is an example illustration of the upper bound area determined as a result of the trilateration with distance bounding (TDB) executor of FIG. 1.

FIG. 6 is an example illustration 600 of the upper bound area determined as a result of the trilateration with distance bounding (TDB) executor 118 of FIG. 1. FIG. 6 includes the destination vehicle 602 (e.g., the destination vehicle 102 of FIG. 1), three vehicles 604, 606, and 608 (e.g., the vehicles 126, 128, and 130 of FIG. 1), and the source vehicle 610 (e.g., the source vehicle 132 of FIG. 1). In examples disclosed herein, the TDB executor, by performing operations to minimize equation 1, determines the area in which the source vehicle 610 is expected to be in.

Figure 7:
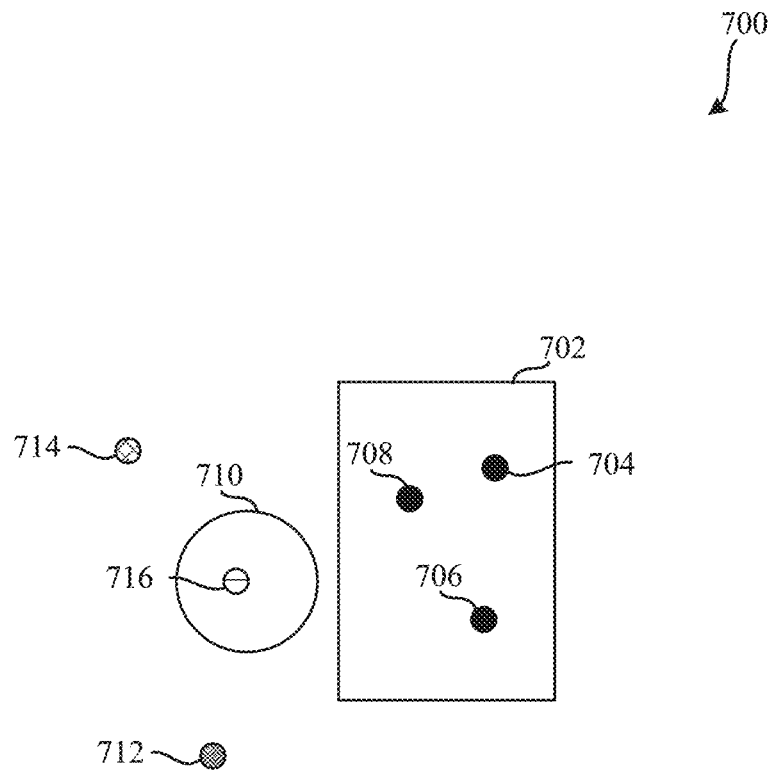

FIG. 7 is an example illustration 700 depicting a triple of vehicles 702, including vehicles 704, 706, and 708, along with an upper bound area 710 (e.g., the upper bound area illustrated in FIG. 6) in which the source vehicle 712 should be in. The estimated location 714 illustrates a case in which the triple of vehicles 702 estimates the location of the source vehicle 712 to be outside the upper bound area 710.

In FIG. 7, the source vehicle 712 portrays its location as being the false location 716. The triple of vehicles 702, using the upper bound area 710, determine the estimated location 714 does not fall within the upper bound area 710. The illustration 700 depicted in FIG. 7 may occur during false alarms. For example, the triple of vehicles 702 may detect the estimated location 714 to be outside of the upper bound area 710 when the source vehicle 712 is an honest vehicle. In examples disclosed herein, the RTX executor 120, the RDX executor 124, and/or the MTX executor 122 of FIG. 1 may utilize the results determined by the TDB executor 118 of FIG. 1.

Figure 8:
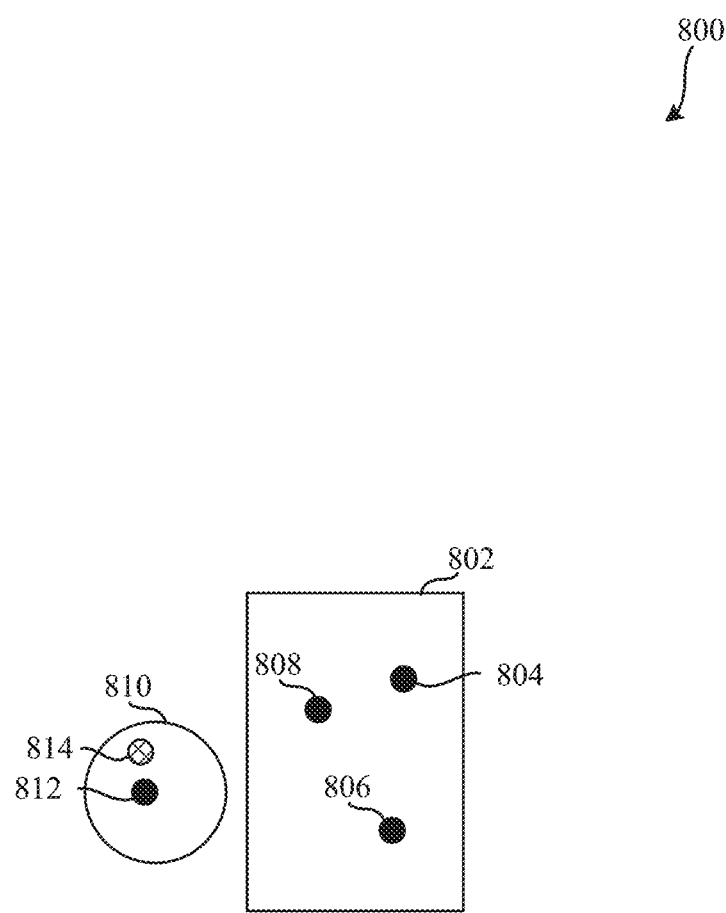

FIG. 8 is an additional example illustration 800 depicting a triple of vehicles 802, including vehicles 804, 806, and 808, along with an upper bound area 810 (e.g., the upper bound area illustrated in FIG. 6) in which the source vehicle 812 should be in. The estimated location 814 illustrates a case in which the triple of vehicles 802 estimates the location of the source vehicle 812 to be inside the upper bound area 810.

In FIG. 8, the triple of vehicles 802 determine the source vehicle 812 is within the upper bound area 810. In such case, the source vehicle 812 may be determined to be honest. The illustration 800 depicted in FIG. 8 may occur during missdetects. For example, the triple of vehicles 802 may detect the estimated location 814 to be within the upper bound area 810 when the source vehicle 812 is not an honest vehicle. In examples disclosed herein, the RTX executor 120, the RDX executor 124, and/or the MTX executor 122 of FIG. 1 may utilize the results determined by the TDB executor 118 of FIG. 1.

Figure 9:
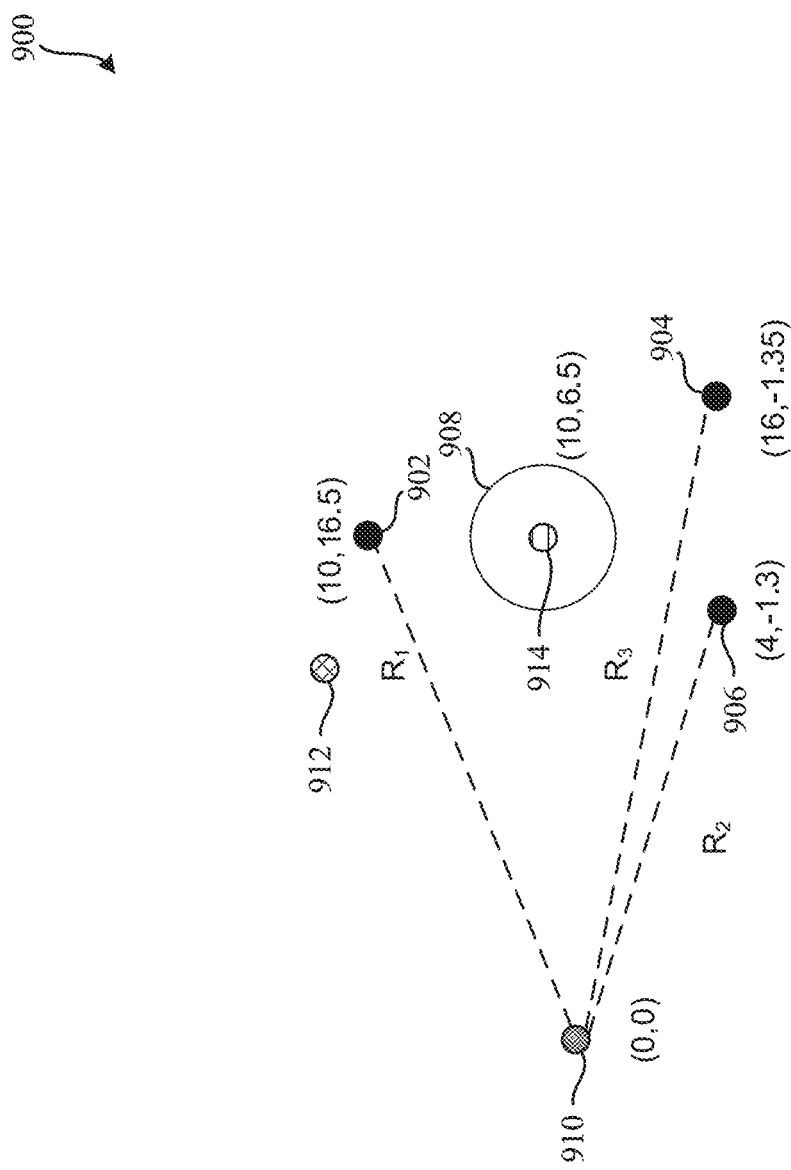
FIG. 9 is an example illustration depicting further detail of the determination of the example estimated location.

FIG. 9 is an example illustration 900 depicting further detail of the determination of the example estimated location 912. The vehicles 902, 904, and 906 report their respective locations with respect to the source vehicle 910. In the example depicted in FIG. 9, the estimated location 912 is outside the upper bound area 908. The upper bound area 908 is determined with respect to the false location 914 provided by the source vehicle 910. In some examples disclosed herein, the example location verifier 117 in the anomaly detector 104 of FIG. 1 may obtain the respective locations from the vehicles 902, 904, 906 in a manner consistent with the transfer of the data 134a, 134b, and 134c of FIG. 1.

The location verifier 117 of FIG. 1 may execute the minimization of equation 1, in which, $$\hat{R}_i = \sqrt{R_i^2 + n_i^2}, \, i \in \{1, 2, 3\} \quad (7)$$

In FIG. 9, $R_1$, $R_2$, and $R_3$ are the actual distances between the vehicles 902, 904, 906, and the source vehicle 910, respectively. The variable $n_i$ is the Gaussian noise and represents the inaccuracies of the estimated distance by each vehicle 902, 904, 906 that also affects the accuracy of the output of the TDB executor 118.

Figure 10:
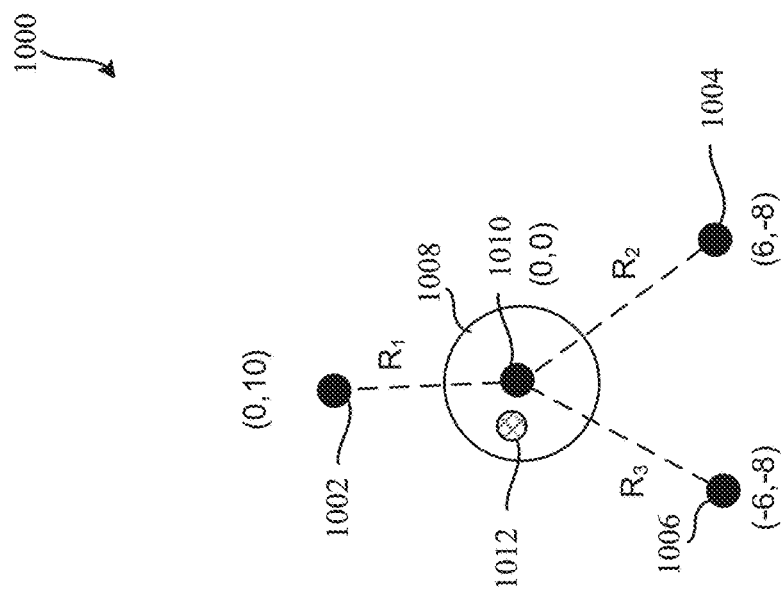
FIG. 10 is an additional example illustration depicting further detail of the determination of the example estimated location.

FIG. 10 is an example illustration 1000 depicting further detail of the determination of the example estimated location 1012. The vehicles 1002, 1004, and 1006 report their respective locations with respect to the source vehicle 1010. In the example depicted in FIG. 10, the estimated location 1012 is inside the upper bound area 1008. The upper bound area 1008 is determined with respect to the source vehicle 1010 (e.g., in FIG. 10, the source vehicle is an honest vehicle). In some examples disclosed herein, the example location verifier 117 in the anomaly detector 104 of FIG. 1 may obtain the respective locations from the vehicles 1002, 1004, 1006 in a manner consistent with the transfer of the data 134a, 134b, and 134c of FIG. 1.

The location verifier 117 of FIG. 1 may execute the minimization of equation 1, in which, $$\hat{R}_i = \sqrt{R_i^2 + n_i^2}, \, i \in \{1,2,3,\} \qquad (8)$$

In FIG. 10, $R_1$, $R_2$, and $R_3$ are the actual distances between the vehicles 1002, 1004, 1006, and the source vehicle 1010, respectively. The variable $n_i$ is the Gaussian noise and represents the inaccuracies of the estimated distance by each vehicle 1002, 1004, 1006 that also affects the accuracy of the output of the TDB executor 118.

While an example manner of implementing the anomaly detector 104 of FIG. 1 is illustrated in FIGS. 1-4, one or more of the elements, processes and/or devices illustrated in FIG. 1-4 may be combined, divided, re-arranged, omitted, eliminated and/or implemented in any other way. Further, the example emitter 110, the example receiver 112, the example validator 114, the example transmitter 116, the example speed verifier 109, the example detector 108, the example notifier 111, the example TDB executor 118, the example RDX executor 124, the example RTX executor 120, the example MTX executor 124, the example distance estimator 202, the example distance obtainer 204, the example majority determiner 206, the example distance pairs 302, 402, the example TDB interface 304, 406, the example verifier 308, 410, the example majority determiner 308, the example distance sub pairs, and/or the example location determiner 408.and/or, more generally, the example anomaly detector 104 of FIG. 1 may be implemented by hardware, software, firmware and/or any combination of hardware, software and/or firmware. Thus, for example, any of the example emitter 110, the example receiver 112, the example validator 114, the example transmitter 116, the example speed verifier 109, the example detector 108, the example notifier 111, the example TDB executor 118, the example RDX executor 124, the example RTX executor 120, the example MTX executor 124, the example distance estimator 202, the example distance obtainer 204, the example majority determiner 206, the example distance pairs 302, 402, the example TDB interface 304, 406, the example verifier 308, 410, the example majority determiner 308, the example distance sub pairs, and/or the example location determiner 408.and/or, more generally, the example anomaly detector 104 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example emitter 110, the example receiver 112, the example validator 114, the example transmitter 116, the example speed verifier 109, the example detector 108, the example notifier 111, the example TDB executor 118, the example RDX executor 124, the example RTX executor 120, the example MTX executor 124, the example distance estimator 202, the example distance obtainer 204, the example majority determiner 206, the example distance pairs 302, 402, the example TDB interface 304, 406, the example verifier 308, 410, the example majority determiner 308, the example distance sub pairs, and/or the example location determiner 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example anomaly detector 104 of FIG. 1 may include one or more elements, processes and/or devices in addition to, or instead of, those illustrated in FIG. 1-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the anomaly detector 104 of FIG. 1 is shown in FIG. 11-16. The machine readable instructions may be an executable program or portion of an executable program for execution by a computer processor such as the processor 1712 shown in the example processor platform 1700 discussed below in connection with FIGS. 11-16. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIGS. 11-16, many other methods of implementing the example anomaly detector 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 11-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 11:
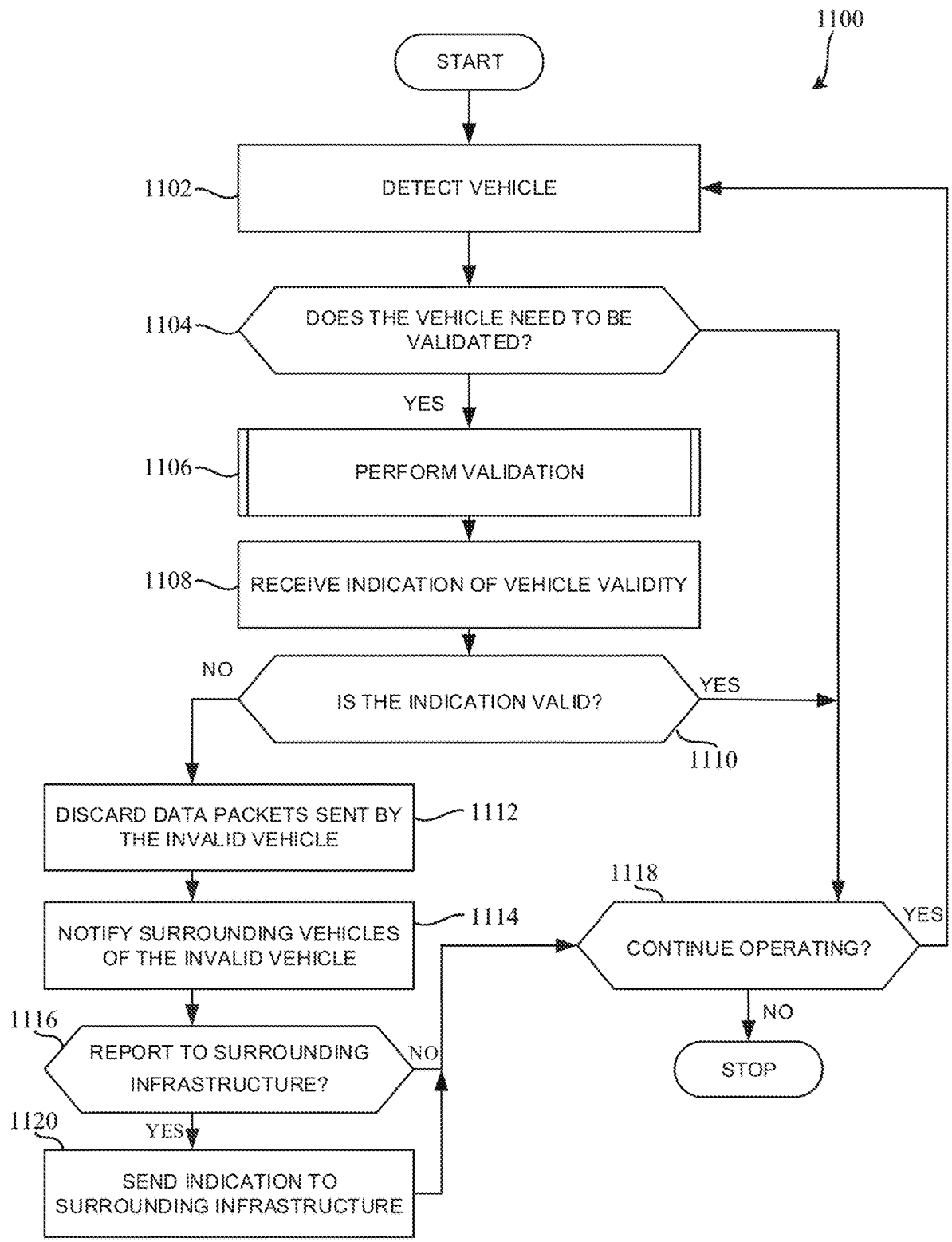
FIG. 11 is a flowchart representative of machine readable instructions that may be executed to implement the example anomaly detector of FIG. 1.

FIG. 11 is a flowchart 1100 representative of machine readable instructions that may be executed to implement the example anomaly detector 104 of FIG. 1. The anomaly detector 104 detects a first vehicle (e.g., the source vehicle 132) in an intelligent transportation system 100 (Block 1102). In some examples disclosed herein, the detector 108 of FIG. 1 may detect the first vehicle (e.g., the source vehicle 132) using V2X communication networks (Block 1102). The detector 108 in communication with the vehicle profile database 106 to determine if the vehicular profile 140 is inconsistent. If it is determined that the vehicular profile 140 is inconsistent, then the detector may communicate such result to the speed verifier 109 and/or the location verifier 117 for validation (Block 1104). If it is not determined that the vehicular profile 140 is inconsistent, then the detector communicates with the anomaly detector 104 to determine whether or not to continue operating (Block 1118).

The speed verifier 109 and/or the location verifier 117 perform the validation to determine an indication of whether or not the vehicle is valid (Block 1106). Regardless of the indication, the notifier 111 obtains the indication from the speed verifier 109 and/or the location verifier 117 (Block 1108). The notifier 111 analyzes the indication to determine whether or not the detected vehicle (e.g., the source vehicle 132) is valid or invalid (Block 1110). If the detected vehicle (e.g., the source vehicle 132) is valid, then the notifier 111 communicates with the anomaly detector 104 to determine whether or not to continue operating (Block 1118).

If the notifier 111 determines that the detected vehicle (e.g., the source vehicle 132) is invalid, then the notifier 111 communicates with the vehicle profile database 106 to discard all data packets sent by the invalid vehicle (Block 1112). Additionally, the notifier 111 notifies all surrounding vehicles (e.g., the vehicles 126, 128, and/or 130) of the invalid detected vehicle (e.g., the source vehicle 132) (Block 1114). In examples disclosed herein, the notifier 111 determines whether or not to report the detected vehicle (e.g., the source vehicle 132) to surrounding infrastructure (Block 1116). Examples disclosed herein include reporting the detected vehicle (e.g., the source vehicle 132) to surrounding entities in the intelligent transportation system 100 capable of V2X communication (Block 1120).

In some examples disclosed herein, the notifier 111 may not determine whether or not to report the invalid detected vehicle (e.g., the source vehicle 132) to surrounding infrastructure (Block 1116). In such examples, the notifier 111, in response to notifying surrounding vehicles of the invalid vehicle (e.g., the source vehicle 132) (Block 1114), may communicate with the anomaly detector 104 to determine whether or not to continue operating (Block 1118).

Examples disclosed herein in which the anomaly detector 104 determines not to continue operating include loss of power, loss of communication ability with any detected vehicle (e.g., the source vehicle 132), and/or a vehicular accident.

Figure 12:
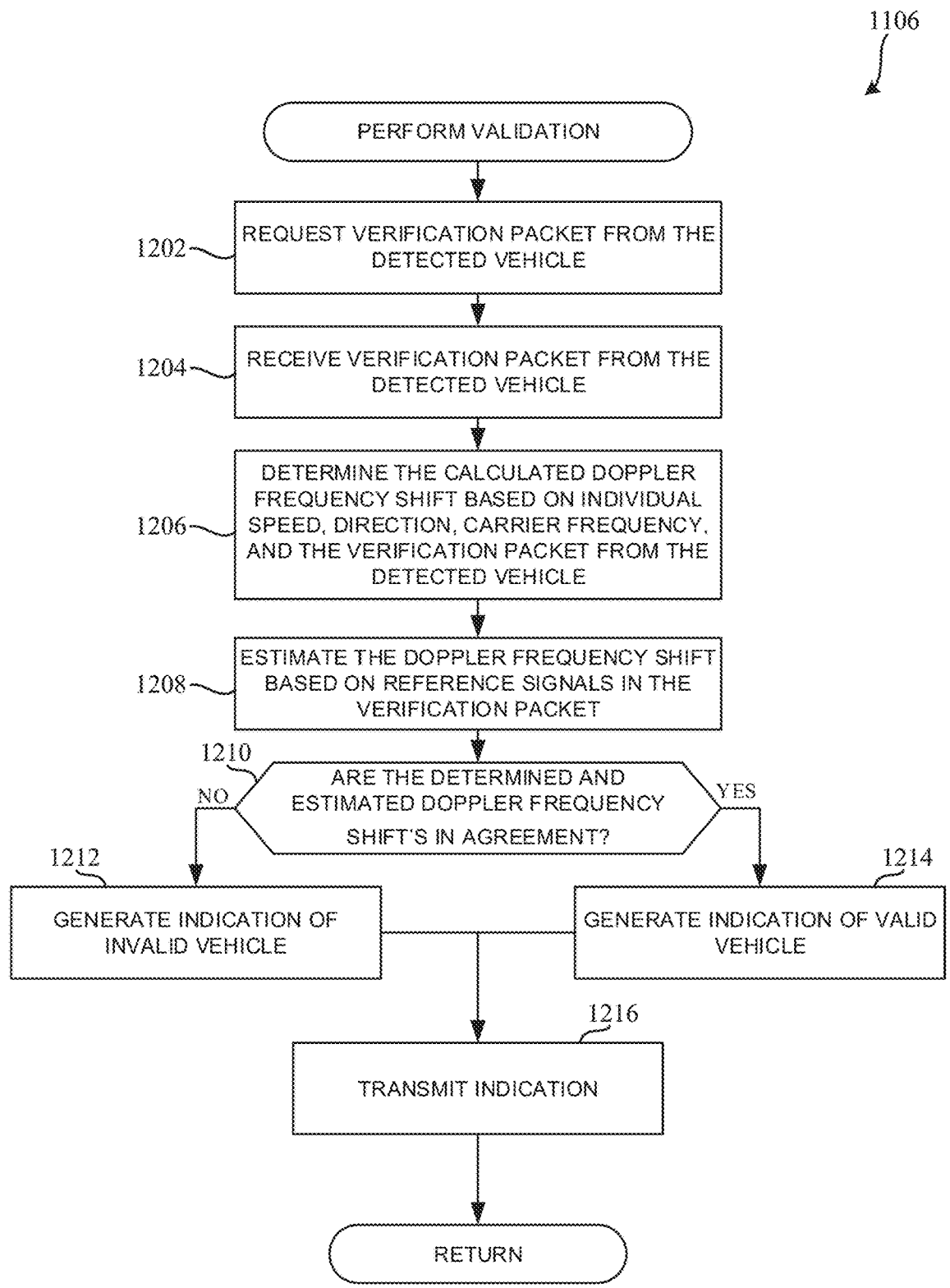
FIG. 12 is a flowchart representative of machine readable instructions that may be executed to implement the example speed verifier of FIG. 1 to perform validation.

FIG. 12 is a flowchart representative of machine readable instructions that may be executed to implement the example speed verifier 109 of FIG. 1 to perform validation (Block 1106). The emitter 110 of FIG. 1 requests verification packets from the detected vehicle (e.g., the source vehicle 132). In examples disclosed herein, the vehicular profile 140 related to the detected vehicle (e.g., the source vehicle 132) may be communicated to the receiver 112 and/or the emitter 110 via the communication bus 119 (Block 1202). The receiver 112 receives the verification packet (e.g., the vehicular profile 140) relating to the detected vehicle (e.g., the source vehicle 132) (Block 1204).

The validator 114 determines the calculated Doppler frequency shift in response to obtaining the individual speed, direction, carrier frequency, and the verification packer (e.g., the vehicular profile 140) from the detected vehicle (e.g., the source vehicle 132) (Block 1206). In examples disclosed herein, the validator 114 executes the processes in equations 2-6 to determine the calculated Doppler frequency shift. Additionally, the validator 114 estimates what the Doppler frequency shift should be based on reference signals in the verification packer (e.g., the vehicular profile 140) (Block 1208). In some examples disclosed herein, the validator may calculate the Doppler frequency shift (Block 1206) and estimate the Doppler frequency shift (Block 1208) simultaneously.

The validator 114 determines if the calculated Doppler frequency shift agrees with the estimated Doppler frequency (Block 1210). If the calculated Doppler frequency shift is determined to be closely relates to the estimated Doppler frequency shift (e.g., the calculated Doppler frequency shift is similar to the estimated Doppler frequency shift), then the validator 114 generates an indication of a valid vehicle (Block 1214). Alternatively, if the calculated Doppler frequency shift differs from the estimated Doppler frequency shift (e.g., the calculated Doppler frequency shift is not similar to the estimated Doppler frequency shift), then the validator 114 generates an indication of an invalid vehicle (Block 1212).

In either instance, the transmitter 116 transmits the indication to the notifier 111 (Block 1216). In examples disclosed herein, the transmitter 116 may transmit the indication via the communication bus 119.

Figure 13:
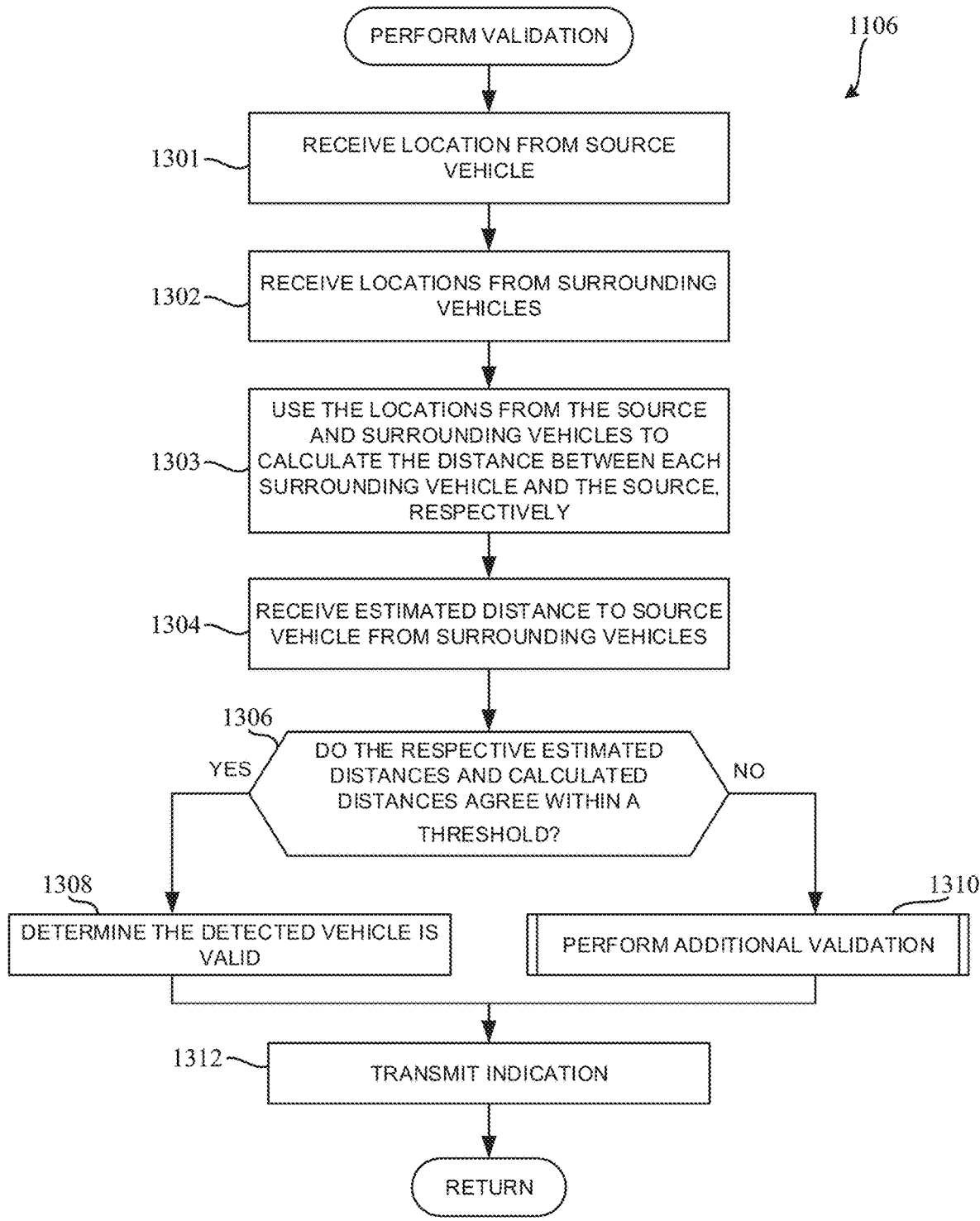
FIG. 13 flowchart representative of machine readable instructions that may be executed to implement the example RDX executor of FIGS. 1 and 2 to perform validation.

FIG. 13 flowchart representative of machine readable instructions that may be executed to implement the example RDX executor 120 of FIGS. 1 and 2 to perform validation (Block 1106). The distance obtainer 204 obtains and/or receives location information from the source vehicle 132 in the intelligent transportation system 100 (Block 1301). Additionally, the distance obtainer 204 obtains and/or receives location information from all surrounding vehicles (e.g., the vehicles 126, 128, and/or 130) in the intelligent transportation system 100 (Block 1302). In response, the distance obtainer 204 and/or the distance estimator 202 uses the locations from the source vehicle 132 and surrounding vehicles (e.g., the vehicles 126, 128, and/or 130) to calculate the distance between each surrounding vehicle (e.g., the vehicles 126, 128, and/or 130) and the source vehicle 132, respectively, in the intelligent transportation system 100 (Block 1303). The distance obtainer 204 and/or the distance estimator 202 obtains and/or receives respective estimated locations of the detected vehicle (e.g., the source vehicle 132) from the surrounding vehicles (e.g., the vehicles 126, 128, and/or 130) in the intelligent transportation system 100 (Block 1304).

The majority determiner 206 determines if the respective estimated distances and respective calculated distances agree within a threshold. (Block 1306). For example, the majority determiner 206 determines if the majority of reported locations (e.g., the location received by the distance obtainer 204 and/or the distance estimator 202) are in agreement with respect to the location of the detected vehicle (e.g., the source vehicle 132). If the majority determiner 206 determines the reported locations (e.g., the location received by the distance obtainer 204 and/or the distance estimator 202), are in agreement, then the majority determiner 206 determines the detected vehicle (e.g., the source vehicle 132) is valid (Block 1308) and further transmits the valid indication to the notifier 111 (Block 1312).

If the majority determiner 206 determines the reported locations (e.g., the location received by the distance obtainer 204 and/or the distance estimator 202), are not in agreement, then additional validation is performed (Block 1310). Additionally, after additional validation is performed, the resulting indication is further transmitted to the notifier 111 (Block 1312).

In some examples disclosed herein, Blocks 1301, 1302, 1303, 1304, 1306, 1308, and 1312 may not be performed and, instead block 1310 may be performed to execute the instruction of Block 1106 in FIG. 11. In such examples, the machine readable instructions represented in FIGS. 14 and/or 15 may be performed to execute the instructions illustrated in Block 1310.

Figure 14:
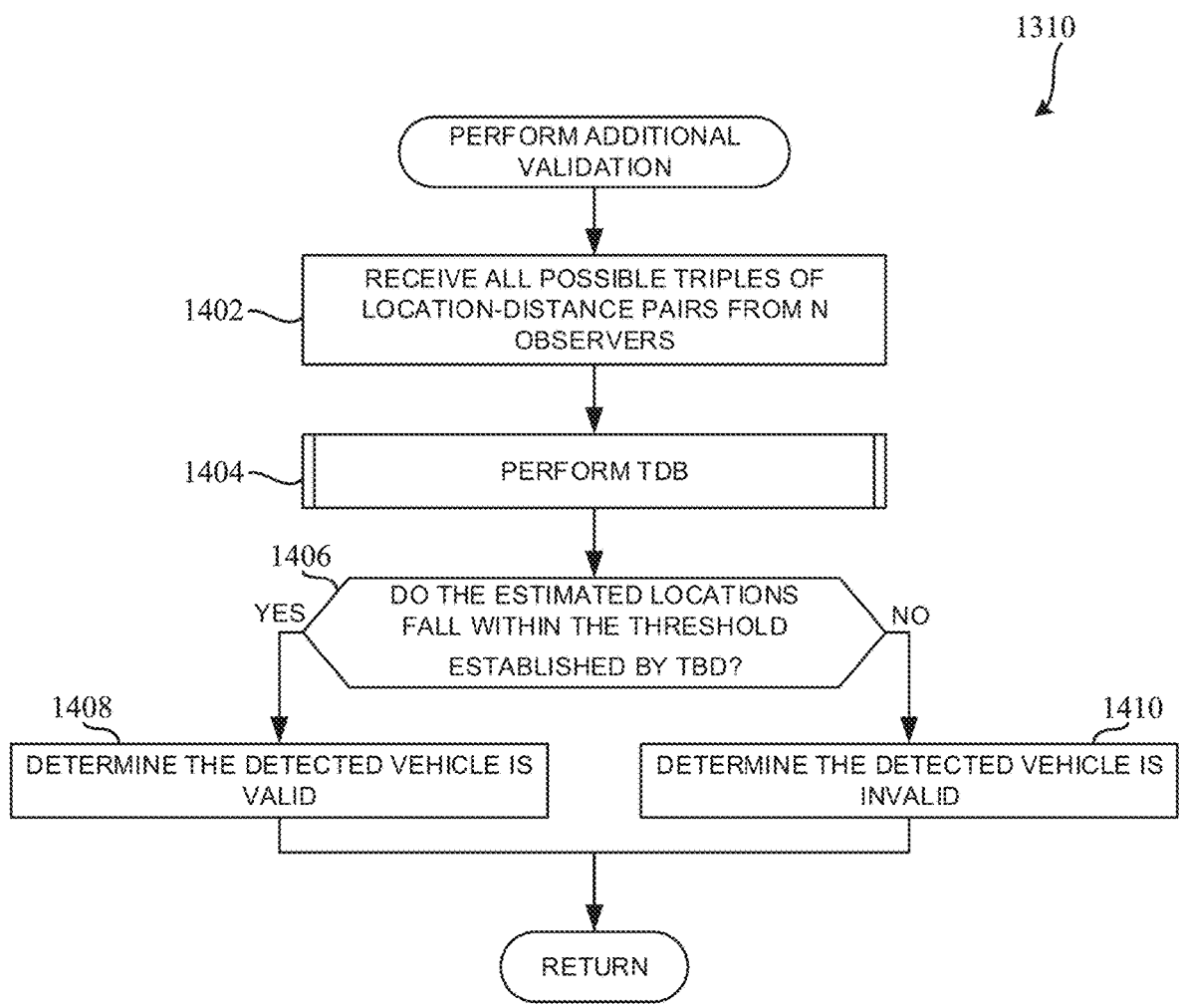
FIG. 14 flowchart representative of machine readable instructions that may be executed to implement the example RTX executor of FIGS. 1 and 3 to perform validation.

FIG. 14 flowchart representative of machine readable instructions that may be executed to implement the example RTX executor 124 of FIGS. 1 and 3 to perform additional validation (Block 1310). In some examples disclosed herein, the machine readable instructions represented in FIG. 14 may be executed to perform validation (Block 1106). In the example intelligent transportation system 100, for all N vehicles (e.g., the vehicles 126, 128, and/or 130), a location-distance pair is received and/or obtained by the distance pairs 302 (Block 1402). In examples disclosed herein, the N location-distance pairs received and/or obtained indicates an individual location of the N vehicles (e.g., the vehicles 126, 128, and/or 130) and their respective distances to the detected vehicle (e.g., the source vehicle 132). The TDB interface 304 communicates to the TDB determiner 118 to perform TDB for all N location-distance pairs (Block 1404). In response to the performance of TDB, the majority determiner 306 determines if the estimated locations fall within a threshold established by the TDB determiner 118 (Block 1406).

If the majority determiner 306 determines the estimated locations are within the threshold established by the TDB determiner 118, then the verifier 308 determines the detected vehicle (e.g., the source vehicle 132) is valid (Block 1408).

If the majority determiner 306 determines the estimated locations are outside the threshold established by the TDB determiner 118, then the verifier 308 determines the detected vehicle (e.g., the source vehicle 132) is invalid (Block 1410).

Figure 15:
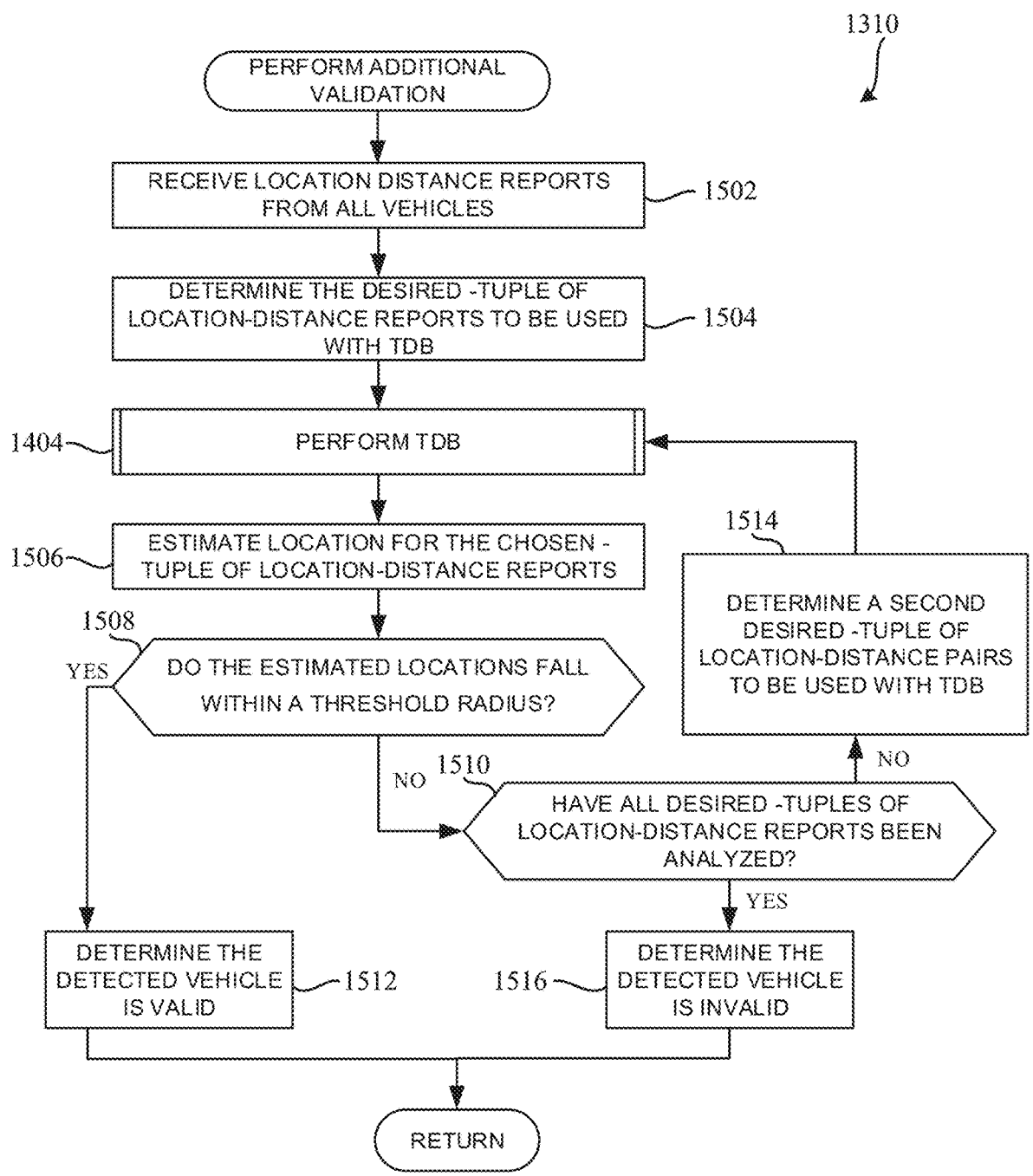
FIG. 15 flowchart representative of machine readable instructions that may be executed to implement the example MTX executor of FIGS. 1 and 4 of FIG. 1 to perform validation.

FIG. 15 flowchart representative of machine readable instructions that may be executed to implement the example MTX executor 122 of FIGS. 1 and 4 of FIG. 1 to perform additional validation (Block 1310). In some examples disclosed herein, the machine readable instructions represented in FIG. 15 may be executed to perform validation (Block 1106). In the example intelligent transportation system 100, for all N vehicles (e.g., the vehicles 126, 128, and/or 130), a location-distance pair is received and/or obtained by the distance pairs 402 (Block 1502). In examples disclosed herein, the N location-distance pairs received and/or obtained indicates an individual location of the N vehicles (e.g., the vehicles 126, 128, and/or 130) and their respective distances to the detected vehicle (e.g., the source vehicle 132). In the flowchart illustrated in FIG. 15, N is seven vehicles; however, in examples disclosed herein, N is not limited to any specific vale. The distance pairs 402 determine a desired -tuple of location-distance pairs to be used by the TDB interface 406 (Block 1504).

After knowing the desired -tuple of location-distance pairs, the TDB interface 406 communicates with the TDB determiner 118 to perform TDB on the location-distance pairs (Block 1404). The location determiner 408 estimates the location for the above chosen desired -tuple of location-distance pairs (Block 1506). In examples disclosed herein, the verifier 410 determines if the estimated locations fall within a certain threshold radius (Block 1508). If the verifier 410 determines the estimated locations fall within the threshold radius, then the verifier 410 determines the detected vehicle (e.g., the source vehicle 132) is valid (Block 1512).

If the verifier 410 determines the estimated locations do not fall within the threshold radius, the then verifier 410 determines if all -tuples of location-distance pairs have been analyzed (Block 1510). The there are outstanding -tuples of location-distance pairs that have not been analyzed, the then TDB interface 406 communicates with the TDB determiner 118 to identify a second -tuple of location-distance pairs (e.g., the distance sub pairs 404) (Block 1514). In such case, the process is returned to the TDB determiner 118 to perform TDB (Block 1404).

If the verifier 410 determines that all -tuples of location-distance reports have been analyzed, then the verifier determines that the detected vehicle (e.g., the source vehicle 132) is invalid (Block 1516). In examples disclosed herein, the verifier 410 additionally may indicate the true location of the detected vehicle (e.g., the source vehicle 132) in response to determining the valid or invalid indication.

Figure 16:
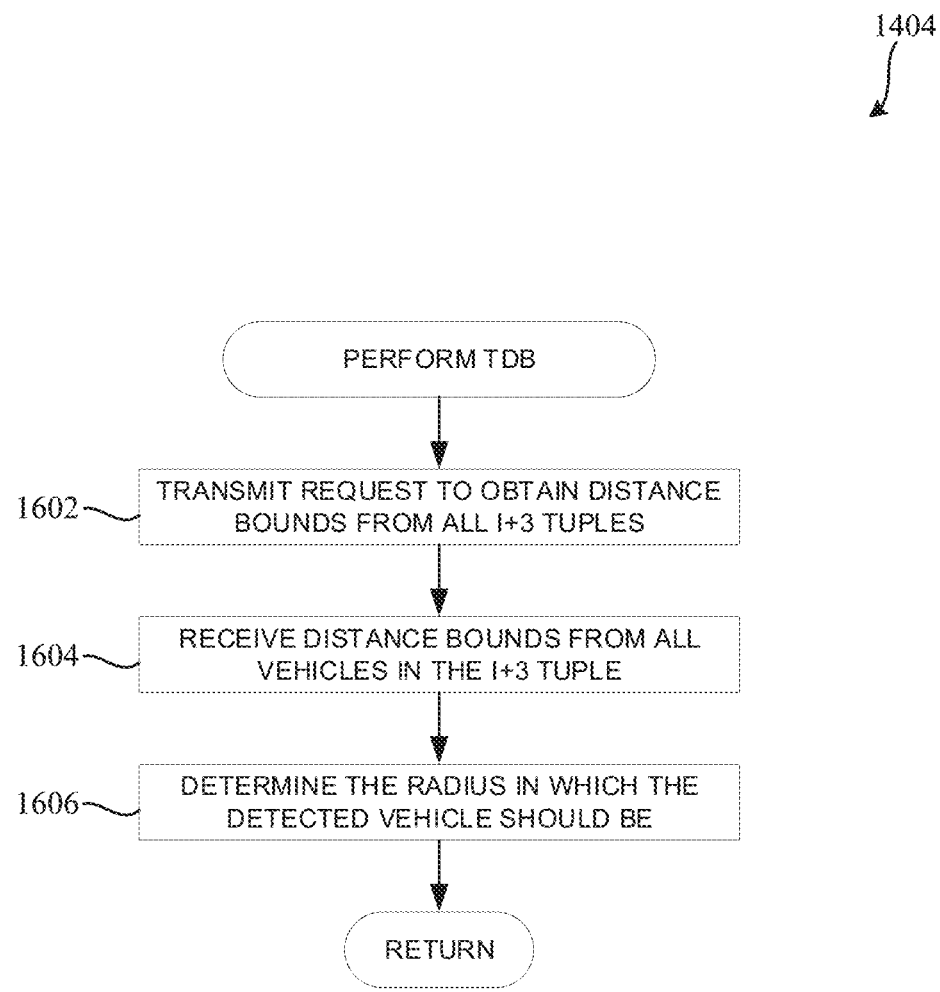
FIG. 16 flowchart representative of machine readable instructions that may be executed to implement the example TDB executor of FIGS. 1-4.

FIG. 16 flowchart representative of machine readable instructions that may be executed to implement the example TDB executor 118 of FIGS. 1-4. The TDB executor 118 transmits a request to obtains all upper distance bounds from the available tuples (e.g., at least i+3 tuples) (Block 1602). In examples disclosed herein, the TDB executor 118 may communicate with the detector 108 to obtain all upper distance bounds from the available tuples (e.g., at least i+3 tuples). In examples disclosed herein, the variable i indicates the number of compromised and/or attacker vehicles (e.g., the source vehicle 132).

The TDB executor 118 receives the upper distance bounds from all vehicles in at least the i+3 tuple (Block 1604). In response, the TDB executor 118 determines a radius in which the detected vehicle is expected to be in (Block 1606). In examples disclosed herein, the TDB executor 118 executes the process in Block 1606 by performing the methods in equation 7 and/or 8.

Figure 17:
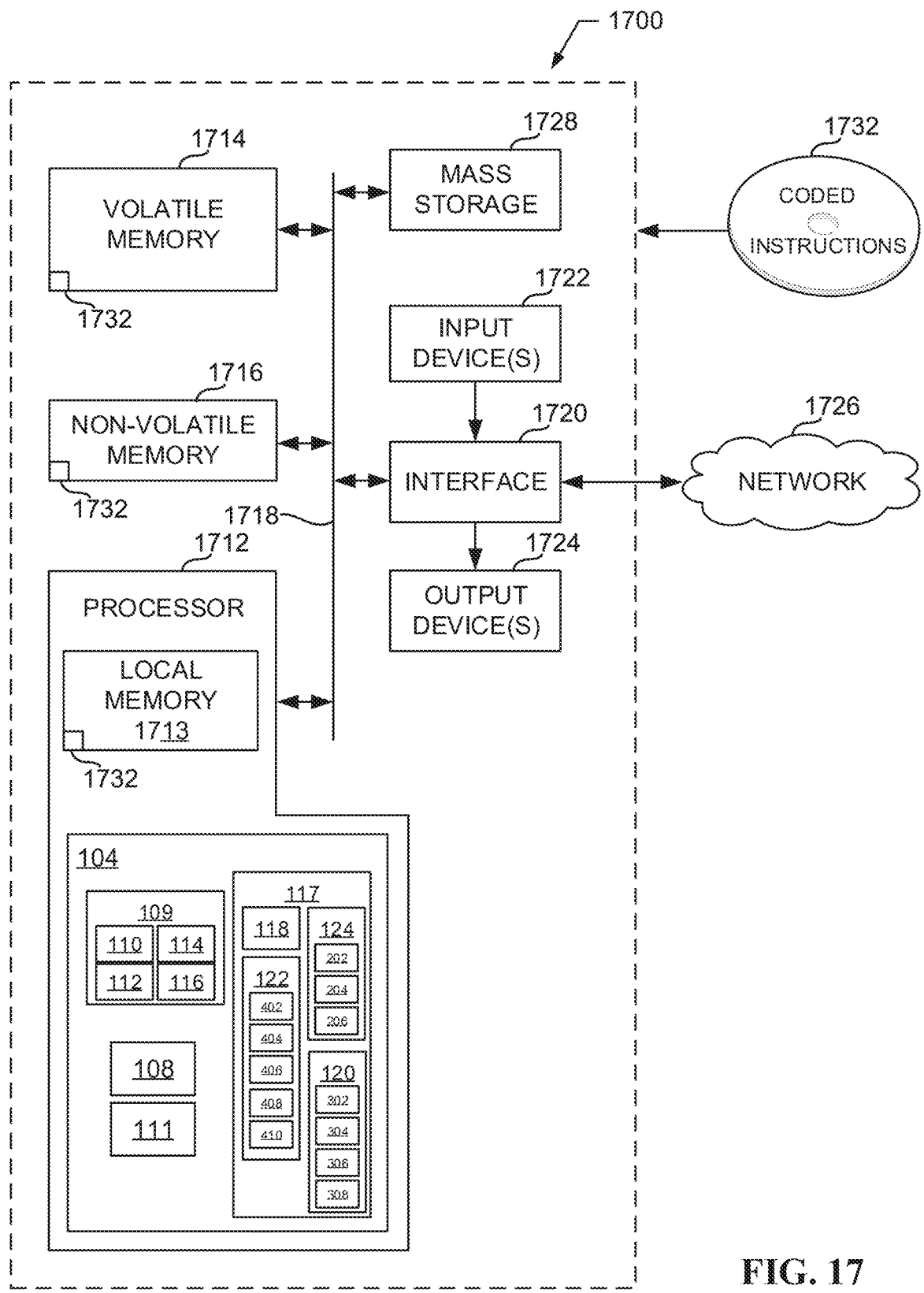
FIG. 17 is a block diagram of an example processor platform structured to execute the instructions of FIGS. 11-16 to implement the anomaly detector of FIG. 1.

FIG. 17 is a block diagram of an example processor platform 1700 structured to execute the instructions of FIGS. 1-4 to implement the anomaly detector 104 of FIG. 1. The processor platform 1700 can be, for example, an autonomous vehicle, a semi-autonomous vehicle, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example emitter 110, the example receiver 112, the example validator 114, the example transmitter 116, the example speed verifier 109, the example detector 108, the example notifier 111, the example TDB executor 118, the example RDX executor 124, the example RTX executor 120, the example MTX executor 124, the example distance estimator 202, the example distance obtainer 204, the example majority determiner 206, the example distance pairs 302, 402, the example TDB interface 304, 406, the example verifier 308, 410, the example majority determiner 306, the example distance sub pairs, and/or the example location determiner 408.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 11-16 may be stored in the mass storage device 1728, in the volatile memory 1714, in the non-volatile memory 1716, and/or on a removable non-transitory computer readable storage medium such as a CD or DVD.

From the foregoing, it will be appreciated that example methods, apparatus and articles of manufacture have been disclosed that allow an entity in an intelligent transportation system to detect and mitigate anomalous activity. The disclosed methods, apparatus and articles of manufacture improve the efficiency of using a computing device by mitigating an anomalous attack on an autonomous and/or semi-autonomous vehicle and improving the accuracy of vehicle detection in an intelligent transportation system. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following examples are in accordance with teachings of this disclosure.

Example 1 is an apparatus to validate data communicated by a vehicle, the apparatus including an anomaly detector to, in response to data communicated by a vehicle, at least one of compare an estimated speed with a reported speed or compare a location of the vehicle with a reported location. The apparatus further including the anomaly detector to generate an indication of the vehicle in response to the comparison and a notifier to discard data sent by the vehicle and notify surrounding vehicles of the data communicated by the vehicle.

In Example 2, the subject matter of Example 1 can optionally include a speed verifier to compare a calculated Doppler frequency shift and an estimated Doppler frequency shift obtained from the vehicle, to verify data communicated by the vehicle, the calculated Doppler frequency shift calculated using the reported speed, direction, and carrier frequency.

In Example 3, the subject matter of any one or more of Examples 1-2 can optionally include a location verifier to determine if a plurality of vehicles report a matching location for the vehicle.

In Example 4, the subject matter of any one or more of Examples 1-3 can optionally include a trilateral distance bounding executor to determine a threshold radius in which the vehicle is expected to be located in.

In Example 5, the subject matter of any one or more of Examples 1-4 can optionally include the trilateral distance bounding executor to perform trilateral distance bounding on all tuples of vehicles to detect the location, wherein less than half of surrounding vehicles are compromised and colluding with the vehicle.

In Example 6, the subject matter of any one or more of Examples 1-5 can optionally include that the notifier is to report the indication of the vehicle to surrounding infrastructure.

In Example 7, the subject matter of any one or more of Examples 1-6 can optionally include a trilateral distance bounding executor to perform trilateral distance bounding on distance sub pairs to determine the location of the vehicle.

In Example 8, the subject matter of any one or more of Examples 1-7 can optionally include that the notifier is to report the indication of the vehicle, wherein the indication of the vehicle indicates whether the vehicle is invalid or valid.

Example 9 is a method to validate data communicated by a vehicle, the method including in response to data communicated by a vehicle, at least one of, comparing an estimated speed with a reported speed or comparing a location of the vehicle with a reported location. The method further including generating an indication of the vehicle in response to the comparison and, in response to determining that the vehicle is invalid, discarding data sent by the vehicle, and notifying surrounding vehicles of the data communicated by the vehicle.

In Example 10, the subject matter of Example 1 can optionally include comparing a calculated Doppler frequency shift and an estimated Doppler frequency shift obtained from the vehicle to verify data communicated by the vehicle, the calculated Doppler frequency shift calculated using the reported speed, direction, and carrier frequency.

In Example 11, the subject matter of any one or more of Examples 9-10 can optionally include determining if a plurality of vehicles report a matching location for the vehicle.

In Example 12, the subject matter of any one or more of Examples 9-11 can optionally include performing trilateral distance bounding to determine a threshold radius in which the vehicle is expected to be located in.

In Example 13, the subject matter of any one or more of Examples 9-12 can optionally include performing trilateral distance bounding on tuples of vehicles to detect a location, wherein less than half of surrounding vehicles are compromised and colluding with the vehicle.

In Example 14, the subject matter of any one or more of Examples 9-13 can optionally include reporting the indication of the vehicle to surrounding infrastructure.

In Example 15, the subject matter of any one or more of Examples 9-14 can optionally include performing trilateral distance bounding on distance sub pairs to determine the location of the vehicle.

In Example 16, the subject matter of any one or more of Examples 9-15 can optionally include reporting the indication of the vehicle, wherein the indication of the vehicle indicates whether the vehicle is invalid or valid.

In Example 17, the subject matter of any one or more of Examples 9-16 can optionally include performing trilateral distance bounding on tuples of vehicles to detect a true location of the vehicle, wherein less than half of surrounding vehicles are compromised and colluding with the vehicle.

Example 18 is a non-transitory computer readable medium including computer readable instructions which, when executed, cause a processor to at least compare an estimated speed with a reported speed or compare a location of a vehicle with a reported location, and generate an indication of the vehicle in response to the comparison. The computer readable medium further including, in response to determining that the vehicle is invalid, to discard data sent by the vehicle and notify surrounding vehicles of the data communicated by the vehicle.

In Example 19, the subject matter of any one or more of Example 18 can optionally include comparing a calculated Doppler frequency shift and an estimated Doppler frequency shift obtained from the vehicle to verify data communicated by the vehicle, the calculated Doppler frequency shift calculated using the reported speed, direction, and carrier frequency.

In Example 20, the subject matter of any one or more of Examples 18-19 can optionally include determining if a plurality of vehicles report a matching location for the vehicle.

In Example 21, the subject matter of any one or more of Examples 18-20 can optionally include performing trilateral distance bounding to determine a threshold radius in which the vehicle is expected to be located in.

In Example 22, the subject matter of any one or more of Examples 18-21 can optionally include performing trilateral distance bounding on all tuples of vehicles to detect a location, wherein less than half of surrounding vehicles are compromised and colluding with the vehicle.

In Example 23, the subject matter of any one or more of Examples 18-22 can optionally include reporting the indication of the vehicle to surrounding infrastructure.

In Example 24, the subject matter of any one or more of Examples 18-23 can optionally include performing trilateral distance bounding on distance sub pairs to determine the location of the vehicle.

In Example 25, the subject matter of any one or more of Examples 18-24 can optionally include reporting the indication of the vehicle, wherein the indication of the vehicle indicates whether the vehicle is invalid or valid.

What is claimed is:

1. An apparatus to validate data communicated by a vehicle, the apparatus comprising:
   a trilateral distance bounding executor to perform trilateral distance bounding on all tuples of vehicles to detect a location of a vehicle, wherein less than half of surrounding vehicles are compromised and colluding with the vehicle;
   an anomaly detector to, in response to data communicated by the vehicle, at least one of compare an estimated speed with a reported speed, or compare the location of the vehicle with a reported location;
   the anomaly detector to generate an indication of the vehicle in response to the comparison; and
   a notifier to discard data sent by the vehicle and notify the surrounding vehicles of the data communicated by the vehicle.

2. The apparatus of claim 1, further including a speed verifier to compare a calculated Doppler frequency shift and an estimated Doppler frequency shift obtained from the vehicle, to verify data communicated by the vehicle, the calculated Doppler frequency shift calculated using the reported speed, direction, and carrier frequency.

3. The apparatus of claim 1, further including a location verifier to determine if a plurality of vehicles report a matching location for the vehicle.

4. The apparatus of claim 1, further including the trilateral distance bounding executor to determine a threshold radius in which the vehicle is expected to be located in.

5. The apparatus of claim 1, wherein the notifier is to report the indication of the vehicle to surrounding infrastructure.

6. The apparatus of claim 1, further including the trilateral distance bounding executor to perform trilateral distance bounding on distance sub pairs to determine the location of the vehicle.

7. The apparatus of claim 1, wherein the notifier is to report the indication of the vehicle, wherein the indication of the vehicle indicates whether the vehicle is invalid or valid.

8. A method to validate data communicated by a vehicle, the method comprising:
  performing trilateral distance bounding on tuples of vehicles to detect a location of a vehicle, wherein less than half of surrounding vehicles are compromised and colluding with the vehicle;
  in response to data communicated by the vehicle, at least one of comparing an estimated speed with a reported speed or comparing the location of the vehicle with a reported location;
  generating an indication of the vehicle in response to the comparison; and
  in response to determining that the vehicle is invalid, discarding data sent by the vehicle, and notifying surrounding vehicles of the data communicated by the vehicle.

9. The method of claim 8, further including comparing a calculated Doppler frequency shift and an estimated Doppler frequency shift obtained from the vehicle to verify data communicated by the vehicle, the calculated Doppler frequency shift calculated using the reported speed, direction, and carrier frequency.

10. The method of claim 8, further including determining if a plurality of vehicles report a matching location for the vehicle.

11. The method of claim 8, further including performing the trilateral distance bounding to determine a threshold radius in which the vehicle is expected to be located in.

12. The method of claim 8, further including reporting the indication of the vehicle to surrounding infrastructure.

13. The method of claim 8, further including performing the trilateral distance bounding on distance sub pairs to determine the location of the vehicle.

14. The method of claim 8, further including reporting the indication of the vehicle, wherein the indication of the vehicle indicates whether the vehicle is invalid or valid.

15. The method of claim 8, further including performing the trilateral distance bounding on tuples of vehicles to detect a true location of the vehicle, wherein less than half of surrounding vehicles are compromised and colluding with the vehicle.

16. A non-transitory computer readable medium comprising computer readable instructions which, when executed, cause a processor to at least:
  perform trilateral distance bounding on all tuples of vehicles to detect a location of a vehicle, wherein less than half of surrounding vehicles are compromised and colluding with the vehicle;
  compare an estimated speed with a reported speed or compare the location of the vehicle with a reported location;
  generate an indication of the vehicle in response to the comparison; and
  in response to determining that the vehicle is invalid, discard data sent by the vehicle, and notify surrounding vehicles of the data communicated by the vehicle.

17. The computer readable medium of claim 16, further including comparing a calculated Doppler frequency shift and an estimated Doppler frequency shift obtained from the vehicle to verify data communicated by the vehicle, the calculated Doppler frequency shift calculated using the reported speed, direction, and carrier frequency.

18. The computer readable medium of claim 16, further including determining if a plurality of vehicles report a matching location for the vehicle.

19. The computer readable medium of claim 16, further including performing the trilateral distance bounding to determine a threshold radius in which the vehicle is expected to be located in.

20. The computer readable medium of claim 16, further including reporting the indication of the vehicle to surrounding infrastructure.

21. The computer readable medium of claim 16, further including performing trilateral distance bounding on distance sub pairs to determine the location of the vehicle.

22. The computer readable medium of claim 16, further including reporting the indication of the vehicle, wherein the indication of the vehicle indicates whether the vehicle is invalid or valid.

\* \* \* \* \*